US012706472B2

(12) United States Patent
Ma et al.

(10) Patent No.: US 12,706,472 B2
(45) Date of Patent: Aug. 11, 2026

(54) CHARGER, CHARGING CONTROL CIRCUIT, AND METHOD FOR CONTROLLING A CHARGER

(71) Applicant: Anker Innovations Technology Co., Ltd., Changsha (CN)

(72) Inventors: Chao Ma, Shenzhen (CN); Xianghuang Feng, Shenzhen (CN); Songya Chen, Shenzhen (CN); Xiang Zhang, Shenzhen (CN)

(73) Assignee: Anker Innovations Technology Co., Ltd., Changsha (CN)

( * ) Notice: Subject to any disclaimer, the term of this patent is extended or adjusted under 35 U.S.C. 154(b) by 0 days.

(21) Appl. No.: 19/264,466

(22) Filed: Jul. 9, 2025

(65) Prior Publication Data

US 2026/0031643 A1 Jan. 29, 2026

Related U.S. Application Data

(63) Continuation of application No. PCT/CN2025/098068, filed on May 29, 2025.

(30) Foreign Application Priority Data

Jul. 23, 2024 (CN) ......................... 202410993376.0
Jul. 23, 2024 (CN) ......................... 202410993448.1
Jul. 23, 2024 (CN) ......................... 202410996714.6

(51) Int. Cl.
*H02J 7/70* (2026.01)
*H02J 7/80* (2026.01)
*H02J 7/90* (2026.01)

(52) U.S. Cl.
CPC ................ *H02J 7/933* (2026.01); *H02J 7/70* (2026.01); *H02J 7/80* (2026.01)

(58) Field of Classification Search
CPC . G01R 27/00; G01R 31/3274; H02J 7/00712; H02J 7/0042; H02J 7/0047
See application file for complete search history.

(56) References Cited

U.S. PATENT DOCUMENTS 5,819,597 A 10/1998 Sato et al.
2007/0210800 A1* 9/2007 Krampitz .............. G01R 31/36 324/426

(Continued)

FOREIGN PATENT DOCUMENTS

CN 107086865 A 8/2017
CN 110635547 A 12/2019

(Continued)

OTHER PUBLICATIONS

International Search Report and Written Opinion, International Application No. PCT/CN2025/098068, mailed Sep. 18, 2025 (16 pages).

*Primary Examiner* — Lee E Rodak
*Assistant Examiner* — Demetrius R Pretlow

(57) ABSTRACT

A charger, a charging control circuit, and a method for controlling a charger. The charger includes a housing, a knob, a knob detection structure, a main control board, a display, and a charging control unit. The knob detection structure is configured to detect at least rotation parameters of the knob, and the rotation parameters include at least one of a rotation angle and a rotation direction. The main control board is configured to control the charging control unit to operate according to at least the rotation parameters, and the main control board is further configured to control the display to display charging information of the charging control unit.

19 Claims, 18 Drawing Sheets

(56) References Cited

U.S. PATENT DOCUMENTS

| | | | | |
|---|---|---|---|---|
| 2016/0233707 | A1 | 8/2016 | Kidakarn | |
| 2020/0243285 | A1 * | 7/2020 | Wang | G01R 33/077 |

FOREIGN PATENT DOCUMENTS

| | | | |
|---|---|---|---|
| CN | 215067932 | U | 12/2021 |
| CN | 218102627 | U * | 12/2022 |
| CN | 220022383 | U | 11/2023 |
| CN | 220122270 | U | 12/2023 |
| JP | 2001512858 | A | 8/2001 |

* cited by examiner

211

CHARGER, CHARGING CONTROL CIRCUIT, AND METHOD FOR CONTROLLING A CHARGER

CROSS-REFERENCE TO RELATED APPLICATIONS

The present application is a continuation-application of International (PCT) Patent Application No. PCT/CN2025/098068, filed on May 29, 2025, which claims priority of Chinese Patent Application No. 202410993448.1, filed on Jul. 23, 2024, Chinese Patent Application No. 202410996714.6, filed on Jul. 23, 2024, and Chinese Patent Application No. 202410993376.0, filed on Jul. 23, 2024, the entire contents of which are hereby incorporated by reference in their entirety.

TECHNICAL FIELD

The present disclosure relates to the field of charging technologies, specifically to a charger, a charging control circuit, and a method for controlling a charger.

BACKGROUND

The proliferation of rechargeable smart devices in daily life is accelerating, encompassing smartphones, laptops, tablets, alongside power tools, cordless vacuum cleaners, and car vacuum cleaners, which all require frequent charging.

In the related art, the control over chargers from users typically involves multi-button interfaces, yet the operational procedures remain inherently complex.

SUMMARY OF THE DISCLOSURE

A charger, including: a housing; a knob, rotatably arranged on the housing; a knob detection structure, disposed within the housing and connected to the knob, wherein the knob detection structure is configured to detect at least rotation parameters of the knob, and the rotation parameters include at least one of a rotation angle and a rotation direction; a main control board, disposed within the housing and electrically connected to the knob detection structure; a display, arranged on the housing and exposed through the housing, where the display is electrically connected to the main control board; and a charging control unit, electrically connected to the main control board; wherein the main control board is configured to control the charging control unit to operate according to at least the rotation parameters, and the main control board is further configured to control the display to display charging information of the charging control unit.

A charging control circuit, adapted to the charger as above. The charging control circuit includes: a knob detection module, configured to at least the rotation parameters of the knob; and a main control chip, configured to be disposed on the main control board and electrically connected to the knob detection module; wherein the display is configured to be electrically connected to the main control chip, and the charging control unit is configured to be electrically connected to the main control chip; wherein the main control chip is configured to control the charging control unit to operate according to at least the rotation parameters, and the main control chip is further configured to control the display to display the charging information of the charging control unit according to at least the rotation parameters.

A method for controlling the charger as above, including: obtaining the rotation parameters of the knob detected by the knob detection structure; controlling the charging control unit to operate according to at least the rotation parameters; and controlling the display to display the charging information of the charging control unit.

DETAILED DESCRIPTION

To make the objectives, technical solutions, and advantages of the present disclosure clearer and more understandable, the following detailed description is provided with reference to the accompanying drawings and embodiments. It should be understood that the specific embodiments described herein are merely intended to explain the present disclosure and are not intended to limit the same.

Figure 1:
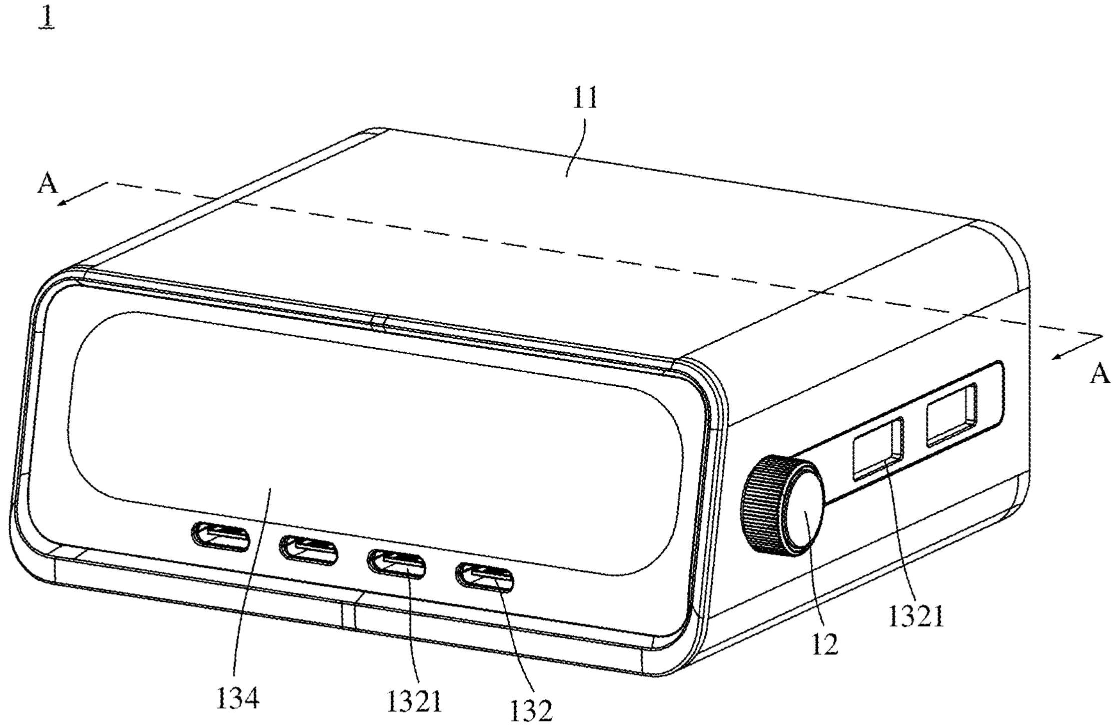
FIG. 1 is a structural schematic view of a charger according to some embodiments of the present disclosure.
Figure 2:
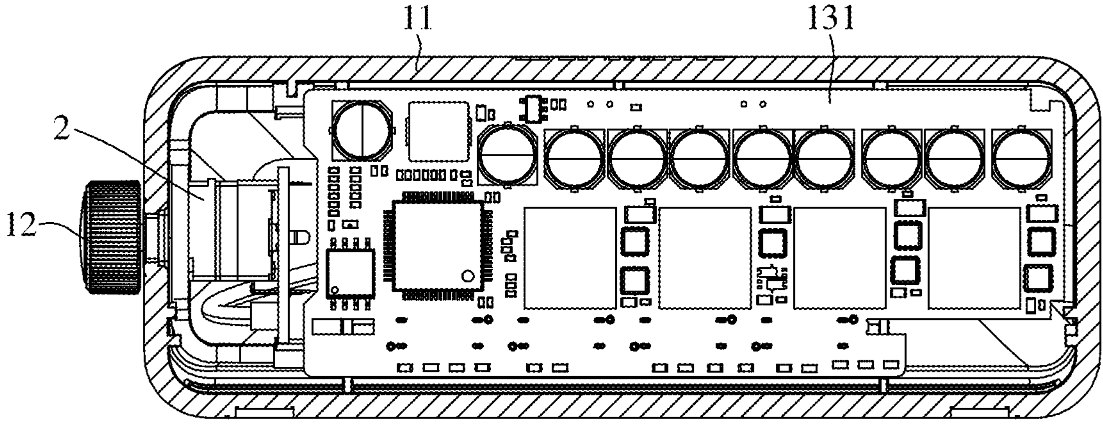
FIG. 2 is a cross-sectional schematic view along line A-A in FIG. 1.

Referring to FIGS. 1 and 2, embodiments of the present disclosure provide a charger 1, which includes a housing 11, a knob 12, a knob detection structure 2, a main control board 131, a display 134, and a charging control unit 132.

The housing 11 is configured to protect components accommodated within the housing 11. The material of the housing 11 may be plastic or metal. Specifically, the housing 11 may be made of plastic to ensure electrical insulation, thereby reducing the risk of electric shock to users. Additionally, the housing 11 is constructed from lightweight plastic material, resulting in a lighter overall charger 1 for enhanced portability and user convenience. Specifically, the housing 11 may be integrally injection molded to provide the housing 11 with high structural strength, thereby preventing the housing 11 from being casily damaged and protecting other components within the housing 11, so as to reduce the probability of damage to other components and thus extend the service life of the charger 1. The housing 11 further includes a mains power interface (not shown), which is configured to connect to the mains power supply.

The knob 12 is rotatably arranged on the housing 11 to allow users to control the charger 1 by operating the knob 12.

The knob detection structure 2 is disposed within the housing 11 and connected to the knob 12. For example, the knob detection structure 2 may include at least one of the following: an electrically conductive mechanical structure, a magnetic detection structure, a light detection structure, a pressure detection structure, or a toggle detection assembly. This allows the knob detection structure 2 to obtain at least one of the following parameters from the knob 12: rotation parameters, press parameters, or toggle parameters. As a result, the main control board 131 can control the charging control unit 132 based on the corresponding parameters. Specifically, the knob detection structure 2 is at least configured to detect the rotation parameters of the knob 12; for example, the rotation parameters may include a rotation angle and/or a rotation direction.

The main control board 131 is disposed within the housing 11 and electrically connected to the knob detection structure 2, and is connected to a battery. It should be understood that the knob detection structure 2 may further include a detection board, which is electrically connected to the main control board 131, and the detection board is configured to detect at least one of the rotation parameters, press parameters, and toggle parameters of the knob 12, and transmit the corresponding parameters to the main control board 131.

The display 134 is arranged on the housing 11 and exposed through the housing 11, and the display 134 is electrically connected to the main control board 131.

The charging control unit 132 is electrically connected to the main control board 131. For example, the charging control unit 132 includes a charging circuit 141 and multiple charging ports 1321, where the multiple charging ports 1321 are arranged on the housing 11 and exposed through the housing 11, and all the charging ports 1321 are electrically connected to the main control board 131. Users can operate the knob 12 to enable the main control board 131 to obtain at least one of the rotation parameters, press parameters, and toggle parameters of the knob 12 through the knob detection structure 2, thereby enabling the main control board 131 to control the display 134 to switch and display charging information of different charging ports 1321 based on the corresponding parameters. The charging information includes at least one of: charging power, charging voltage, and charging current.

For example, the charging ports 1321 include at least one kind of USB-A interface, Micro USB interface, USB Type-C interface, or Lightning interface. The charger 1 may supply power to the charging port 1321 via the mains interface or via a battery, enabling the charging ports 1321 to charge external devices. The external devices may include but are not limited to mobile phones, headphones, tablet computers, and smartwatches.

It should be understood that the charging circuit 141 may be etched onto a charging circuit board to improve the production efficiency of the charging circuit 141, and the charging circuit board may be electrically connected to the main control board 131 arranged with the main control chip 32. The charging circuit 141 may be etched onto the main control board 131. No specific restrictions are imposed on this in the embodiments of the present disclosure.

Figure 17:
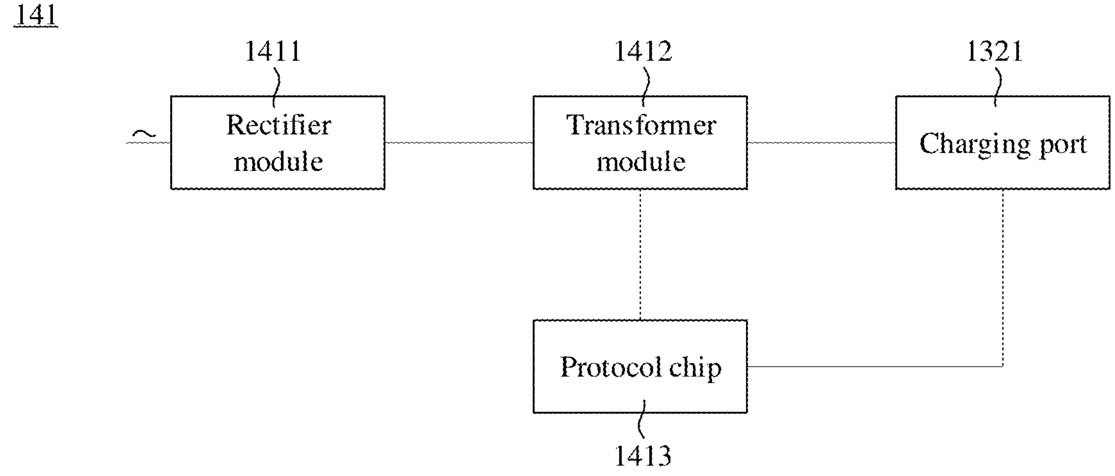
FIG. 17 is a schematic diagram of a framework structure of a charging circuit according to some embodiments of the present disclosure.
Figure 18:
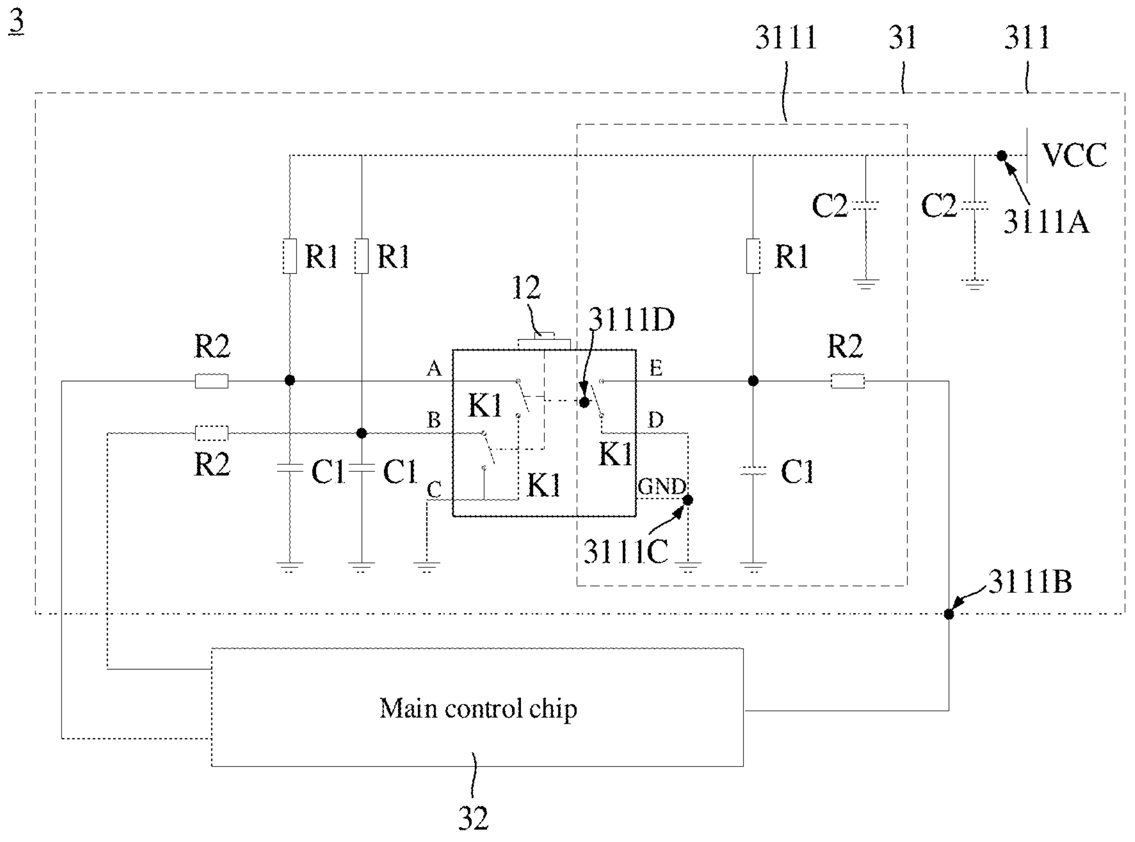
FIG. 18 is a circuit diagram of a rotation detection circuit according to some embodiments of the present disclosure.
Figure 19:
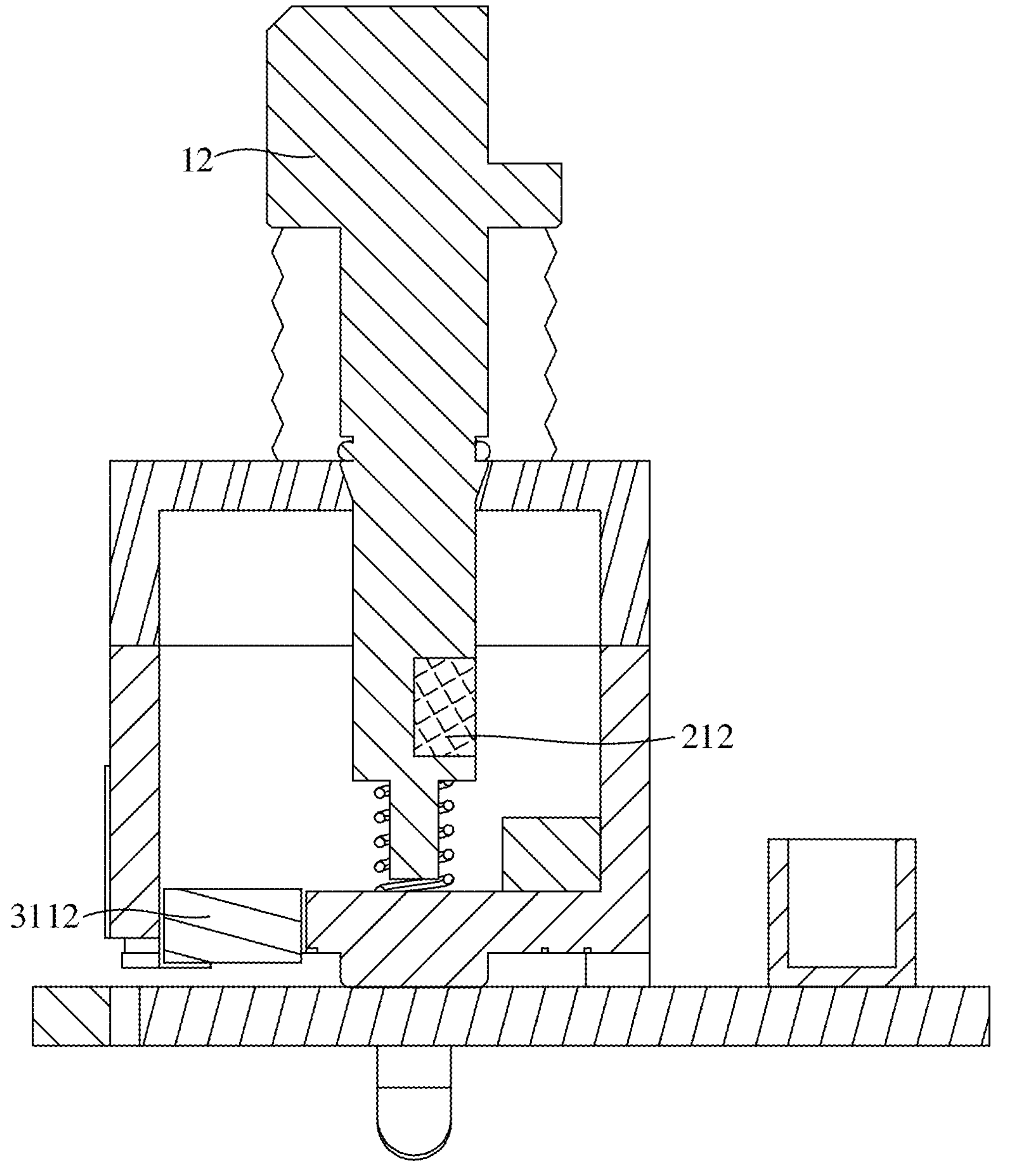
FIG. 19 is a cross-sectional schematic view of a knob detection module according to some embodiments of the present disclosure.
Figure 20:
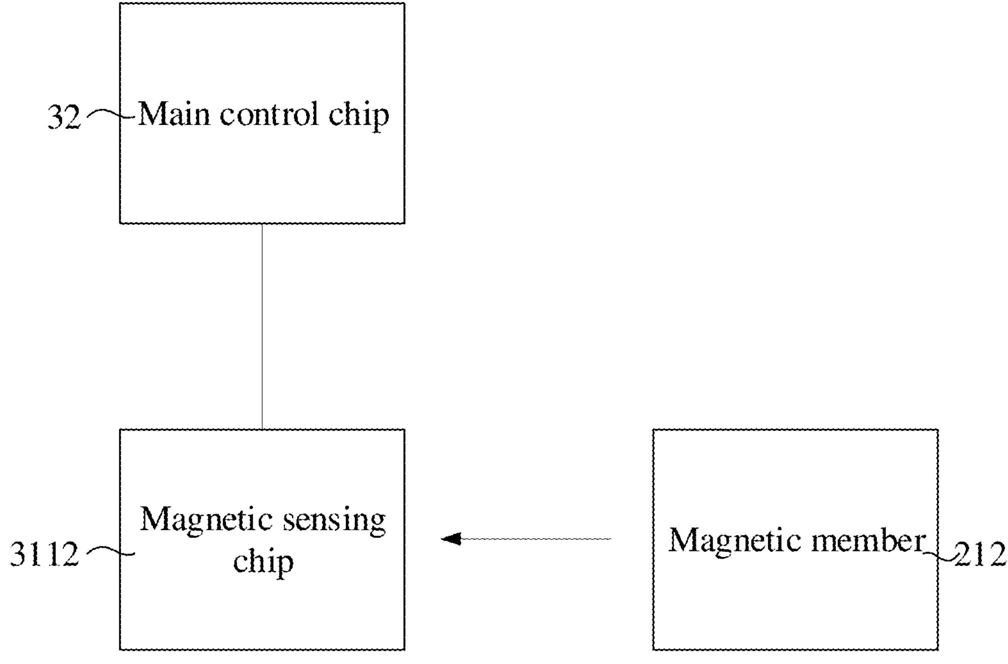
FIG. 20 is a schematic diagram of a frame structure of a knob detection module according to some embodiments of the present disclosure.
Figure 21:
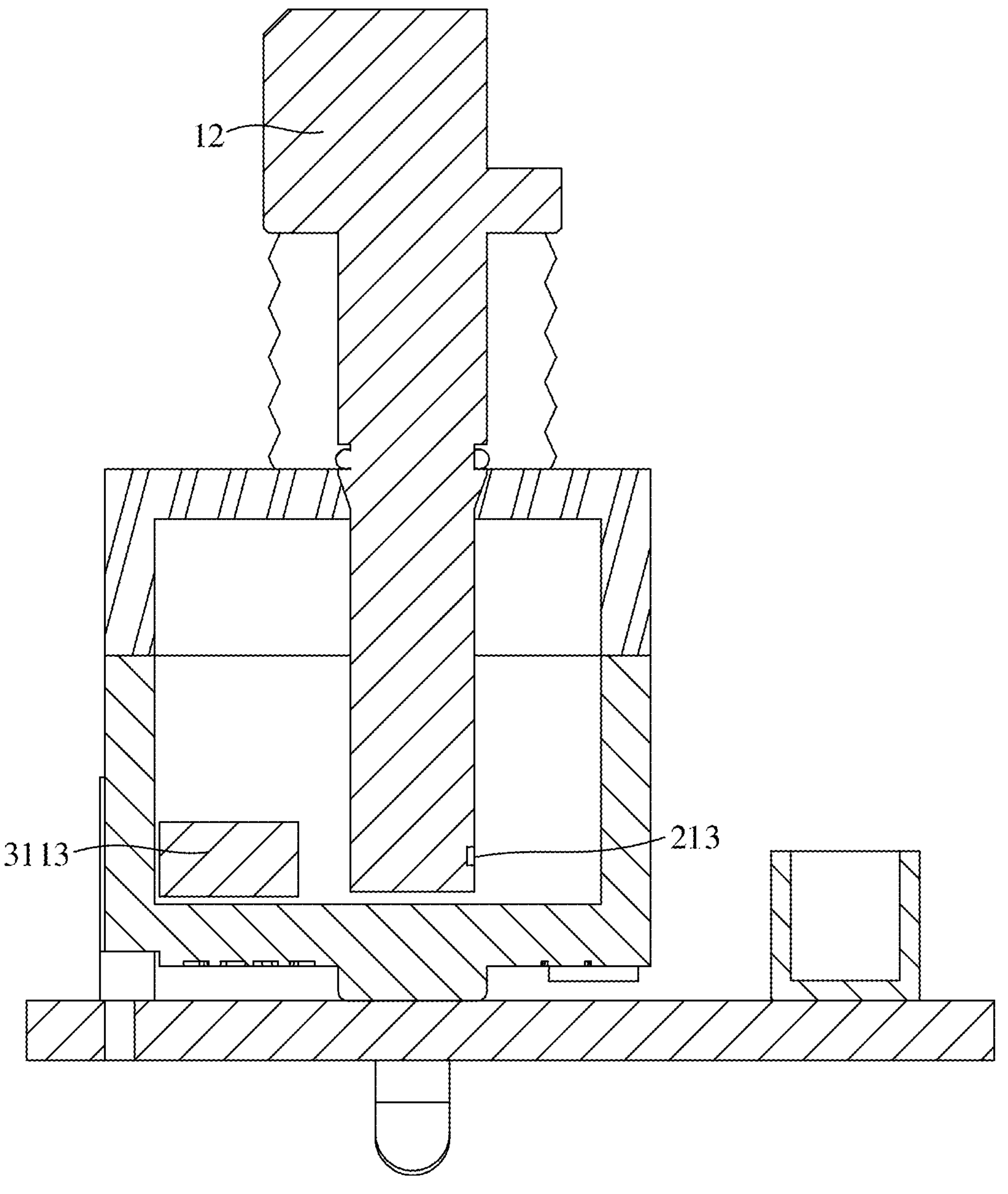
FIG. 21 is a cross-sectional schematic view of a knob detection module according to other embodiments of the present disclosure.
Figure 22:
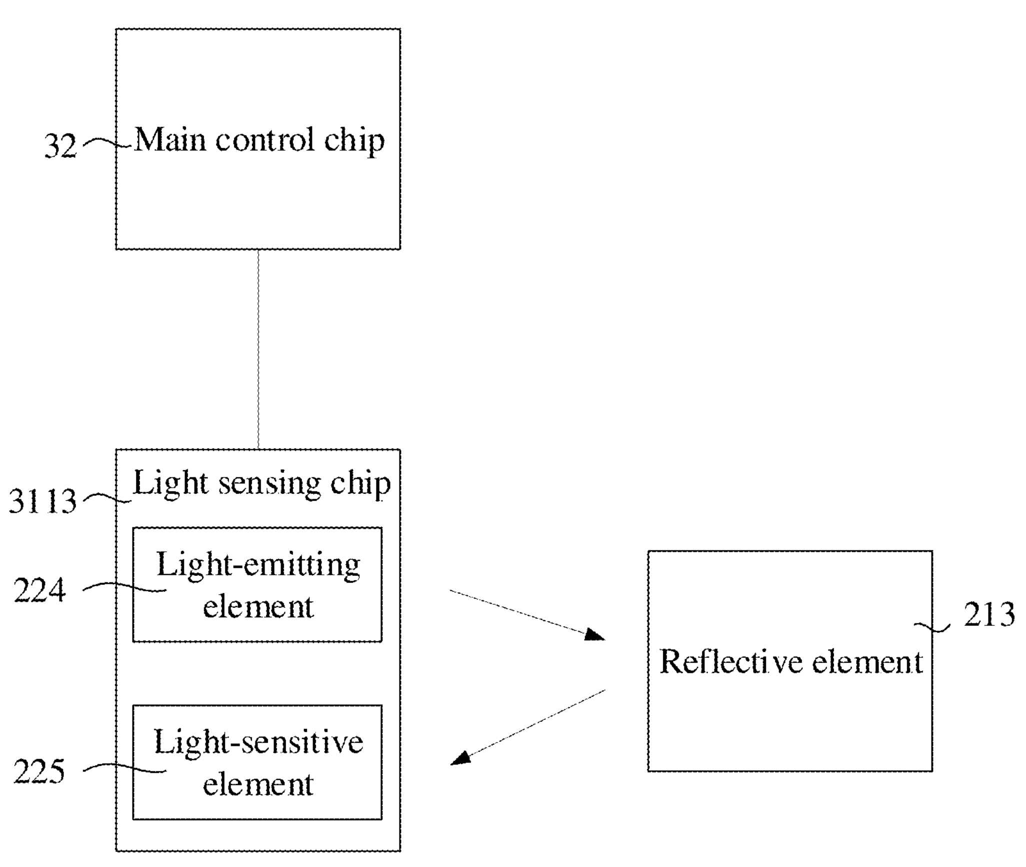
FIG. 22 is a schematic diagram of a frame structure of a knob detection module according to other embodiments of the present disclosure.

It is understood that the charging circuit 141 includes a rectifier module 1411, a transformer module 1412, and a protocol chip 1413 (referring to FIG. 17). The rectifier module 1411 is connected to the mains power supply interface and is configured to convert alternating current (AC) to direct current (DC). The transformer module 1412 is connected to an output end of the rectifier module 1411 and the charging port 1321, and is configured to step down an output voltage of the rectifier module 1411 to match the charging requirements of external devices, thereby improving the charging efficiency of the charger 1 when charging external devices.

The rectifier module 1411 may include a rectifier circuit (not shown), a filter circuit (not shown), and a voltage regulator circuit (not shown). The rectifier circuit is configured to convert AC power into DC power. The rectifier circuit may include, but is not limited to, a bridge rectifier circuit and a pulse width modulation (PWM) rectifier circuit. The filter circuit is configured to filter pulsating DC output from the rectifier circuit, to smooth the waveform of the output DC. The voltage regulator circuit is configured to maintain a constant output voltage. In the embodiments of the present disclosure, the specific form of rectifier module 1411 is not limited.

The transformer module 1412 is configured to step up or step down the DC power output from the rectifier module 1411 and supply power to the charging port, enabling the charging port to output the corresponding voltage. Specifically, the protocol chip 1413 may be connected to the charging port and the transformer module 1412. After an external device is connected to a corresponding charging port 1321, the protocol chip 141 communicates with the external device through the charging port 1321 to exchange information, which includes but is not limited to the remaining power of the external device and the rated charging power of the external device. Afterward, the protocol chip 1413 may output power parameter information corresponding to the external device to the transformer module 1412, enabling the transformer module 1412 to output the charging power required by the external device, thereby matching the output power of the charging circuit 141 with the external device. In other embodiments, the above process may be referred to as a handshake communication between the charger 1 and the external device.

For example, fast-charging protocols supported by the protocol chip 1413 include at least one of: USB Power Delivery (PD) fast-charging protocol, Quick Charge (QC) fast-charging protocol, Fast Charge Protocol (FCP), Super Charge Protocol (SCP), and Mi Turbo Charge protocol. In other embodiments, the fast-charging protocols supported by the protocol chip 1413 may include other types, which may be selected according to the applicable scope of the product.

It should be understood that the charger 1 may further communicate with an external device having a display, such that the main control board 131 can transmit display information to the external device, thereby displaying the information on the display of the external device, and the charger 1 may be controlled by users touching the display of the external device. The communication connection methods include at least one of: wired communication, Wireless Local Area Network (WLAN), Radio Frequency Identification (RFID), Near Field Communication (NFC), ZigBee, Bluetooth, and infrared.

Referring to FIGS. 1 and 2, in the embodiments of the present disclosure, the user may operate the knob 12 to cause the knob detection structure 2 to detect at least the rotation parameters of the knob 12, thereby controlling the charging control unit 132 to control the charger 1. Compared to a scheme where the user has to control the operation of the charger 1 by performing selection multiple times through multiple buttons, the present disclosure achieves control of the charger 1 by operating a single knob 12, thereby simplifying the user's operating steps and improving the usability of the charger 1, and further simplifies the control logic of the charger 1, reduces the complexity of the operating program of the charger 1, and improves the system stability of the charger 1. Furthermore, since the single knob 12 is enough to control the charger 1, the number of operable components on the charger 1 may be reduced, thereby optimizing its appearance layout. Further, the use of internal components in the charger 1 may be reduced, minimizing their space occupancy within the housing 11, thereby shrinking the volume of the housing 11 and making the overall dimensions of the charger 1 smaller, and thus facilitating user portability and usage.

It should be understood that the charger 1 described in the present disclosure is primarily intended for powering mobile phones, headphones, tablet computers, smartwatches, and other small external devices, such as a desktop charger; it is not intended for powering large devices such as electric vehicles or electric bikes, such as a charging station.

Referring to FIGS. 1 and 2, in some embodiments, the charger 1 further includes a functional module, which includes at least one of: an IoT module, a Bluetooth module, a timing module, a power on/off module, and a wireless network module. The main control board 131 is further configured to control the operation of the functional module based on the rotation parameters.

Figure 3:
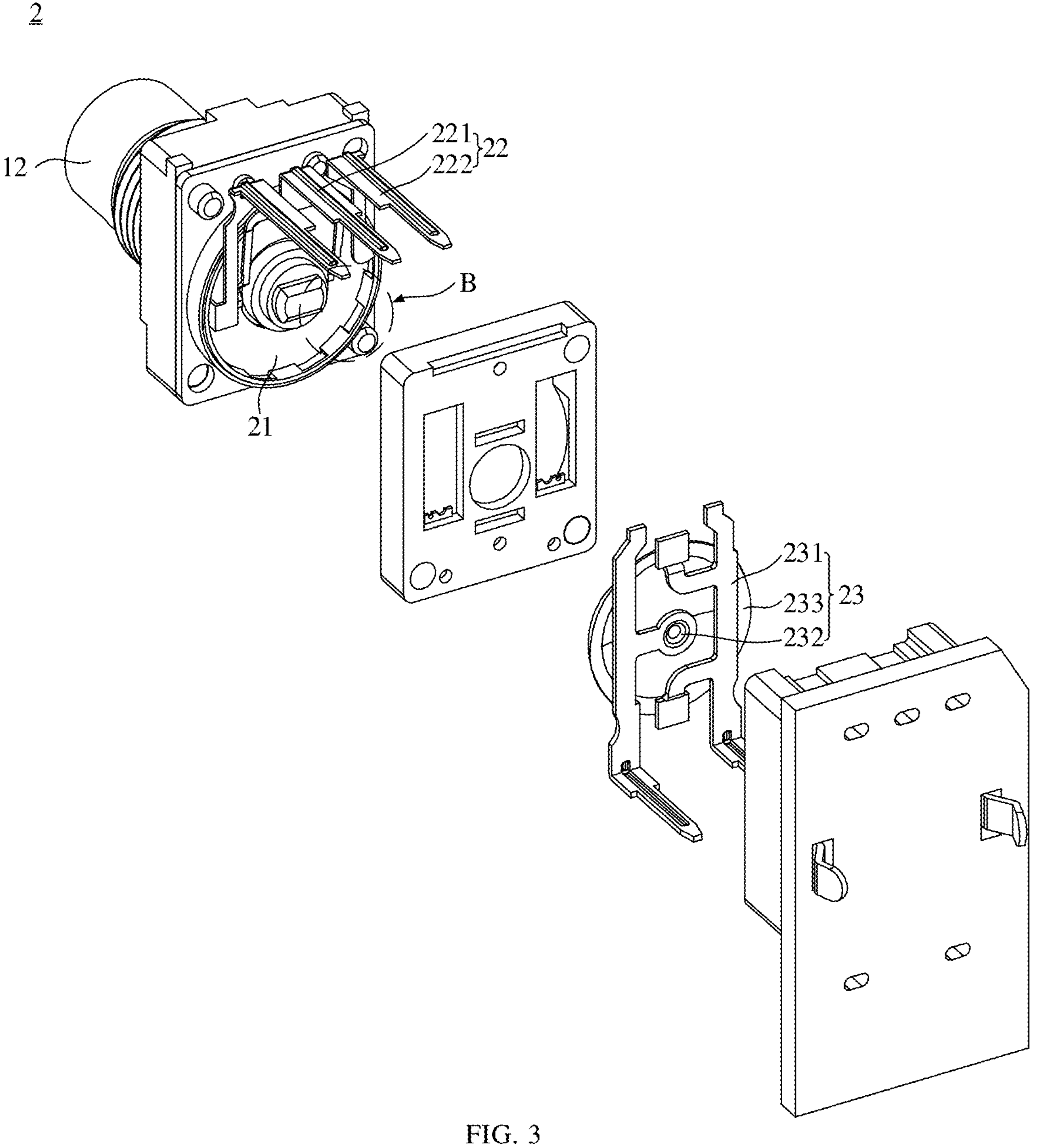
FIG. 3 is an exploded schematic view of a knob detection structure according to some embodiments of the present disclosure.

Referring to FIGS. 1-3, the knob detection structure 2 may include a driven member 21 and a rotation detection assembly 22. The driven member 21 is connected to the knob 12 and is rotatable following the knob 12; the rotation detection assembly 22 is electrically connected to the main control board 131. The rotation detection assembly 22 may cooperate with the driven member 21 to enable the main control board 131 to obtain the rotation parameters of the knob 12. The main control board 131 can control the operation of the charging port 1321 based on the rotation parameters. The main control board 131 is further configured to control the display 134 to switch and display the charging information of different charging ports 1321.

It should be understood that the rotation parameters may represent pre-set rotational positions of the knob 12. When the knob 12 is rotated to a first pre-set rotational position, the display 134 may display the charging information of a first charging port; when the knob 12 is rotated to a second rotational position, the display 134 may display the charging information of a second charging port; when the knob 12 is rotated to a third rotational position, the display 134 may display the charging information of a third charging port . . . and so on. The circumference may be uniformly divided into multiple rotational position groups, with each rotational position group including multiple rotational positions. In this way, when the knob 12 is rotated, the display information can be cyclically switched, thereby achieving stepless adjustment of the knob 12.

Figure 4:
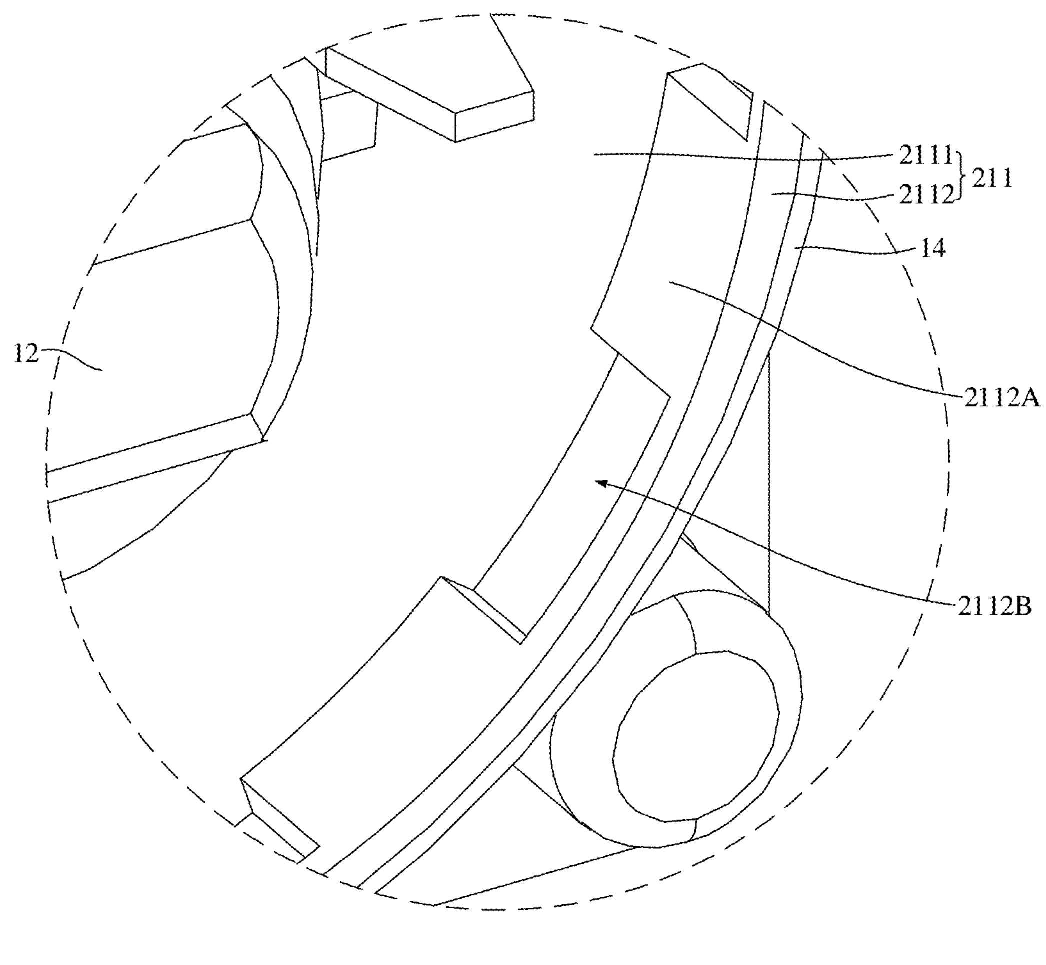
FIG. 4 is an enlarged schematic view of area B circumscribed in FIG. 3.

Referring to FIGS. 2-4, in some embodiments, the driven member 21 may include a conductive member 211, which is connected to the knob 12 to be rotatable following the knob 12; the rotation detection assembly 22 includes a first electrical connection member 221, a second electrical connection member 222, and a rotation detection chip (not shown), where the first electrical connection member 221 is connected to the conductive member 211, the second electrical connection member 222 is spaced apart from the first electrical connection member 221 and can intermittently establish an electrical connection with the conductive member 211, thereby enabling the second electrical connection member 222 to be electrically connected to the first electrical connection member 221; the rotation detection chip is electrically connected to the main control board 131 and is configured to detect the rotation angle and rotation direction of the knob 12. In combination with conductive signals from the second electrical connection member 222 and the first electrical connection member 221, the main control board 131 obtains the rotation parameters of the knob 12. For example, the material of the conductive member 211 may be a metallic material, such as copper or gold.

It should be understood that to prevent the first electrical connection member 221 and the second electrical connection member 222 from being electrically connected to the knob 12, the knob 12 may be made of an insulating material, such as plastic.

Referring to FIGS. 3 and 4, in some embodiments of the present disclosure, an insulating structure may be arranged to connect the conductive member 211 to the knob 12. The insulating structure includes an insulating housing 14, which is connected to the knob 12. The conductive member 211 is disposed on the insulating housing 14 and spaced apart from the knob 12. The connection method between the insulating housing 14 and the knob 12 may include but is not limited to screw connection, adhesive bonding, and snap-fit connection.

Figure 5:
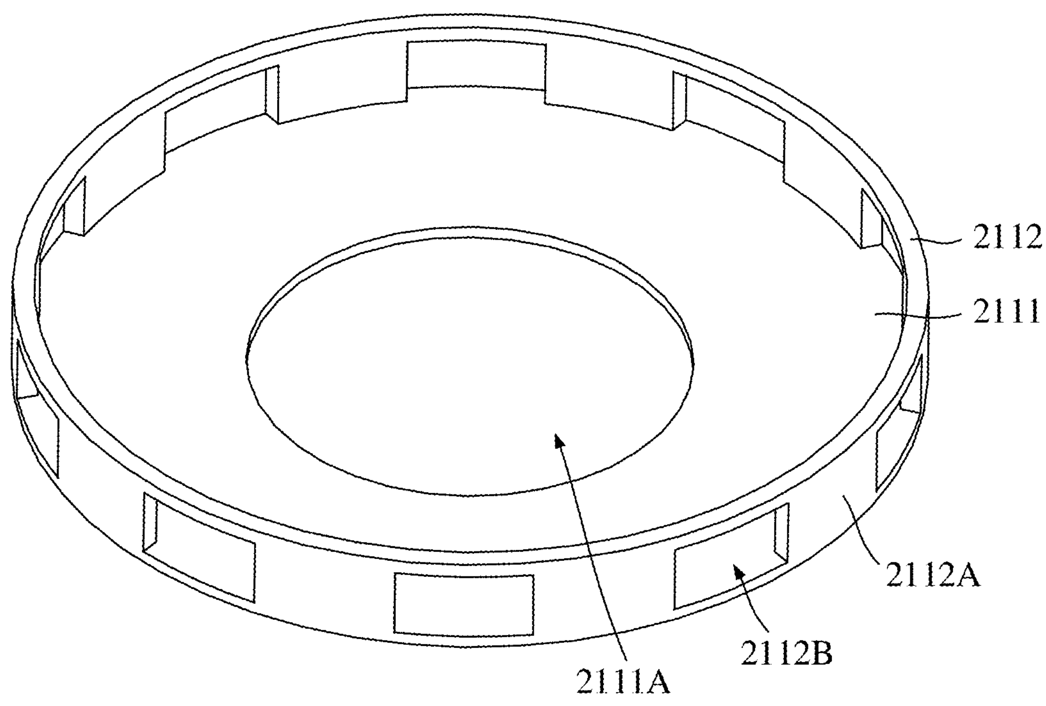
FIG. 5 is a structural schematic view of a conductive member according to some embodiments of the present disclosure.

Referring to FIGS. 3-5, in some embodiments, the conductive member 211 may include a conductive disk 2111 and an enclosure edge 2112; the conductive disk 2111 defines an avoidance hole 2111A, the knob 12 passes through the avoidance hole 2111A and is spaced apart from a hole wall of the avoidance hole 2111A, and the conductive disk 2111 is connected to the knob 12 via the insulating housing 14; the enclosure edge 2112 surrounds a peripheral side of the conductive disk 2111, and the enclosure edge 2112 includes multiple contact portions 2112A uniformly spaced along a periphery of the conductive disk 2111, where the contact portions 2112A are configured to be electrically connected to the second electrical connection member 222.

Specifically, the enclosure edge 2112 defines multiple through slots 2112B, which are uniformly spaced along the periphery of the conductive disk 2111, and each contact portion 2112A is formed between corresponding adjacent two through slots 2112B. It should be understood that the contact portions 2112A may be protruding from a surface of the enclosure edge 2112. In the embodiments of the present disclosure, the specific form of the contact portions 2112A is not limited.

Figure 6:
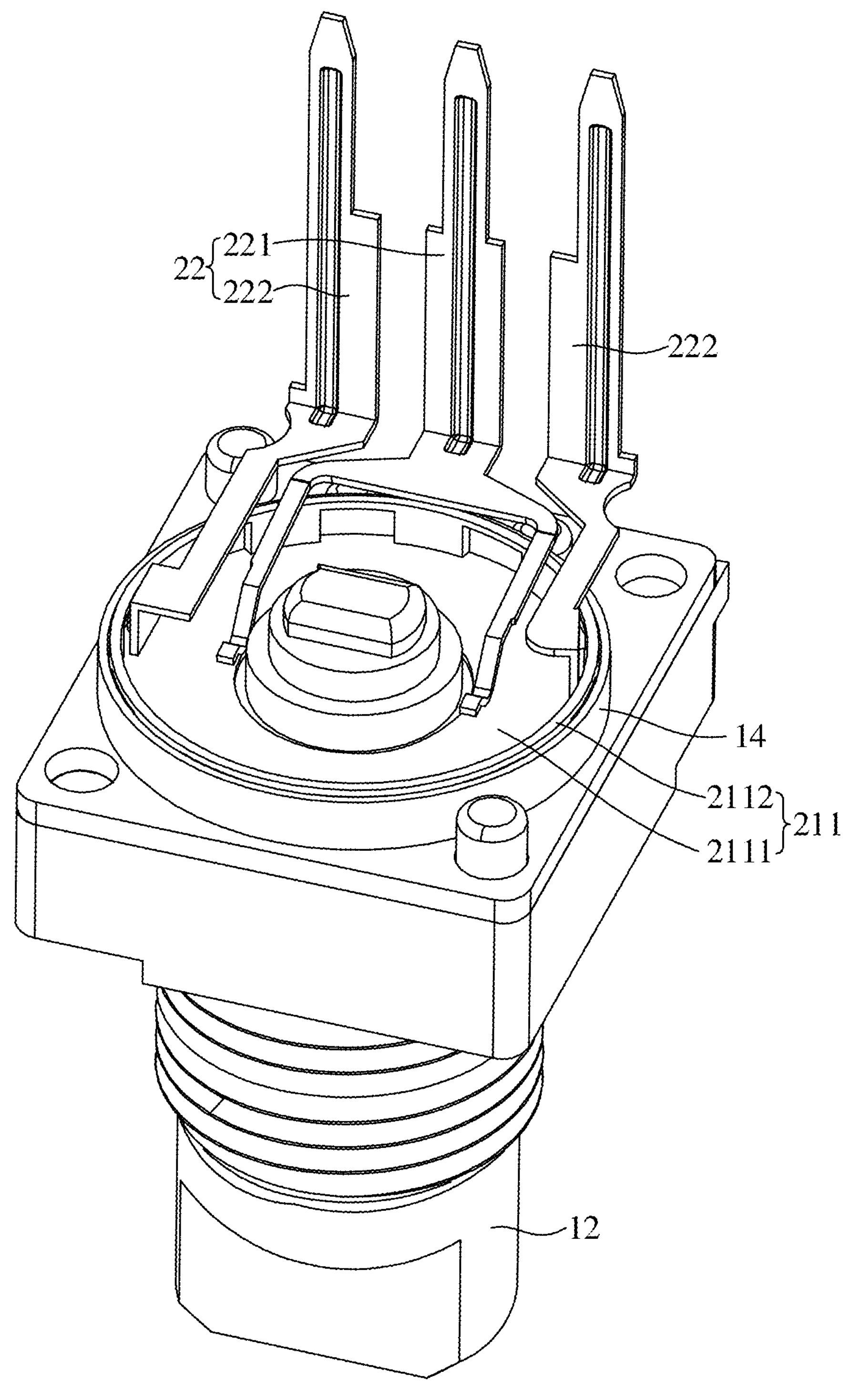
FIG. 6 is a partial schematic view of a knob detection structure according to some embodiments of the present disclosure.

For example, referring to FIGS. 3 and 6, the rotation detection assembly 22 may include one first electrical connection member 221 and two second electrical connection members 222. The first electrical connection member 221 has a contact point in contact with the conductive disk 2111, and the two second electrical connection members 222 are spaced apart and disposed on both sides of the first electrical connection member 221. During the rotation of the knob 12 relative to the housing 11, only one of the two second electrical connection members 222 comes into contact and conducts electricity with the contact portion 2112A, and the two second electrical connection members 222 alternately come into contact and conduct electricity with one of the multiple contact portions 2112A, thereby achieving the switching of the electrical signal. In conjunction with the rotation angle and direction detected by the rotation detection chip, the current rotational position of the knob 12 can be determined, enabling the main control board 131 to obtain the rotation parameters of the knob 12.

It should be understood that the rotation parameters obtained by the main control board 131 may be obtained by receiving the electrical signals from the first electrical connection member 221 and the second electrical connection member 222 when they are conductive, as well as the detection signals from the rotation detection chip. This allows the main control board 131 to obtain the rotation parameters through the electrical signals and the detection signals. Alternatively, the rotation detection chip may receive electrical signals from the first electrical connection member 221 and the second electrical connection member 222 when they are conductive, combine them with its own detection signals, and transmit the combined signals to the main control board 131, thereby enabling the main control board 131 to obtain the rotation parameters. In the embodiments of the present disclosure, the process by which the main control board 131 obtains the rotation parameters is not specifically limited.

Referring to FIGS. 1 and 3-6, it can be understood that the enclosure edge 2112 may be arranged at an angle with the conductive disk 2111, and the enclosure edge 2112 together with the conductive disk 2111 may enclose to define an accommodation cavity. The two second electrical connection members 222 may extend into the accommodation cavity, and other structures of the rotation detection assembly 22 may be at least partially located within the accommodation cavity, thereby reducing the size of the rotation detection assembly 22 in the axial direction of the knob 12. This may reduce the space occupied by the rotation detection assembly 22 within the housing 11, thereby reducing the volume of the housing 11 and enabling the charger 1 to be miniaturized, making it more convenient for users to use and carry. In the embodiments of the present disclosure, the enclosure edge 2112 may be arranged perpendicular to the conductive disk 2111, thereby reducing the overall size of the knob detection structure 2 in the radial direction of the knob 12, and thus miniaturizing the charger 1.

It should be understood that in other embodiments, each contact portion 2112A may be formed with different inclination angles or surface roughness. By detecting the deformation amount of the second electrical connection member 222, the position of the second electrical connection member 222 may be determined, which also corresponds to the current rotational position of the knob 12. Further details are omitted herein.

Figure 7:
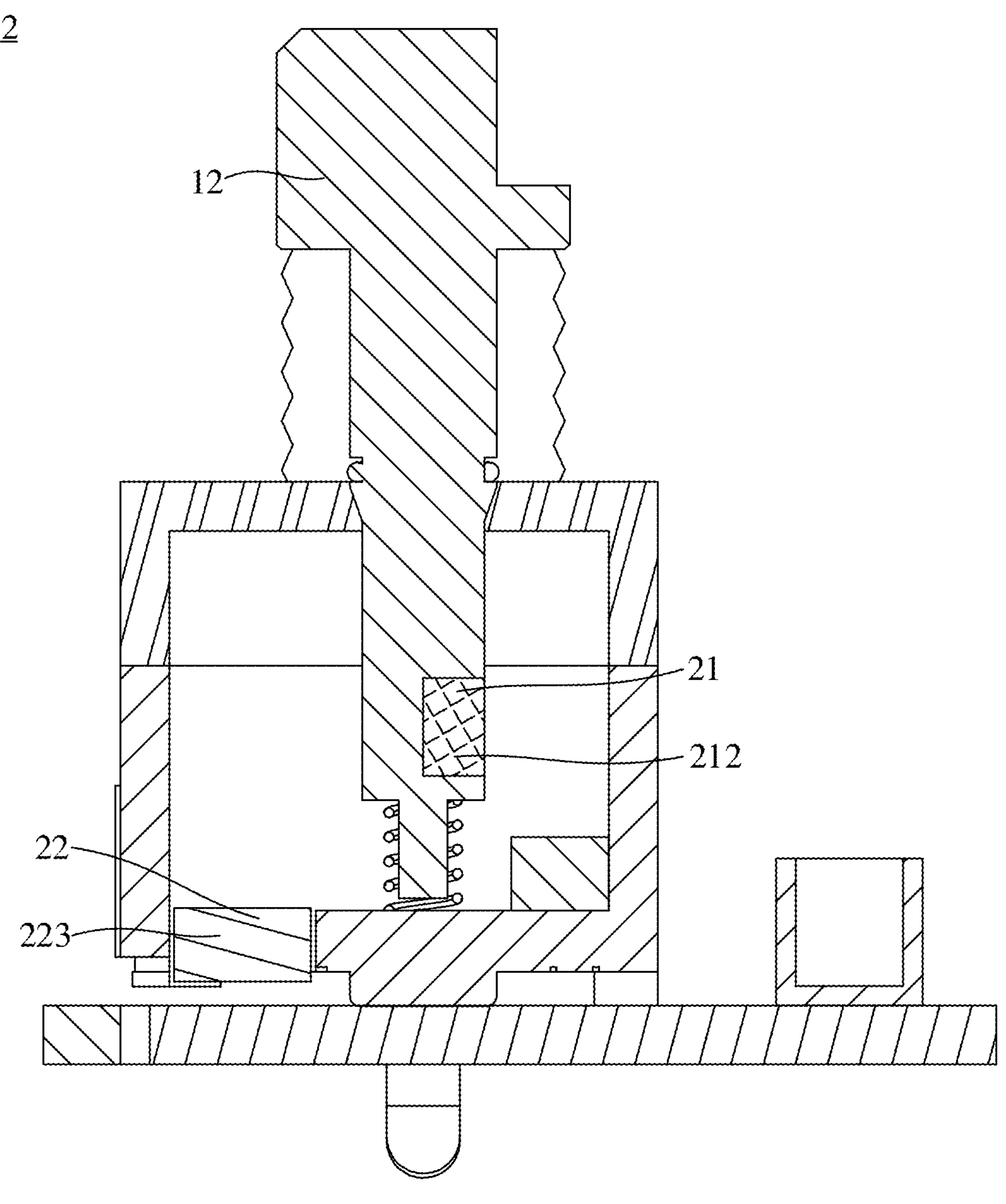
FIG. 7 is a cross-sectional schematic view of a knob detection structure according to some embodiments of the present disclosure.

Referring to FIGS. 1, 2, and 7, in another embodiment, the driven member 21 may further include a magnetic member 212, which is connected to the knob 12; the rotation detection assembly 22 includes a magnetic sensing element 223, which is electrically connected to the main control board 131. When the magnetic member 212 moves with the knob 12, it causes changes in the magnetic field at the location of the magnetic sensing element 223. The magnetic sensing clement 223 generates different electrical signals based on the changes in the magnetic field, enabling the main control board 131 to obtain the rotation parameters of the knob 12. In the embodiments of the present disclosure, no specific restrictions are imposed on the position of the magnetic sensing clement 223 within the magnetic field of the magnetic member 212 or its arrangement.

For example, the magnetic member 212 may be a magnet, the magnetic sensing clement 223 may be a magnetic sensing chip, and the magnetic sensing chip may output different electrical signals based on variations in magnetic field strength. Specifically, when the knob 12 drives the magnet to move, the magnetic field strength around the magnetic sensing chip changes, causing the magnetic sensing chip to output different electrical signals. This allows the main control board 131 to obtain electrical signals corresponding to the position of the magnet, thereby obtaining the rotation parameters of the knob 12.

Figure 8:
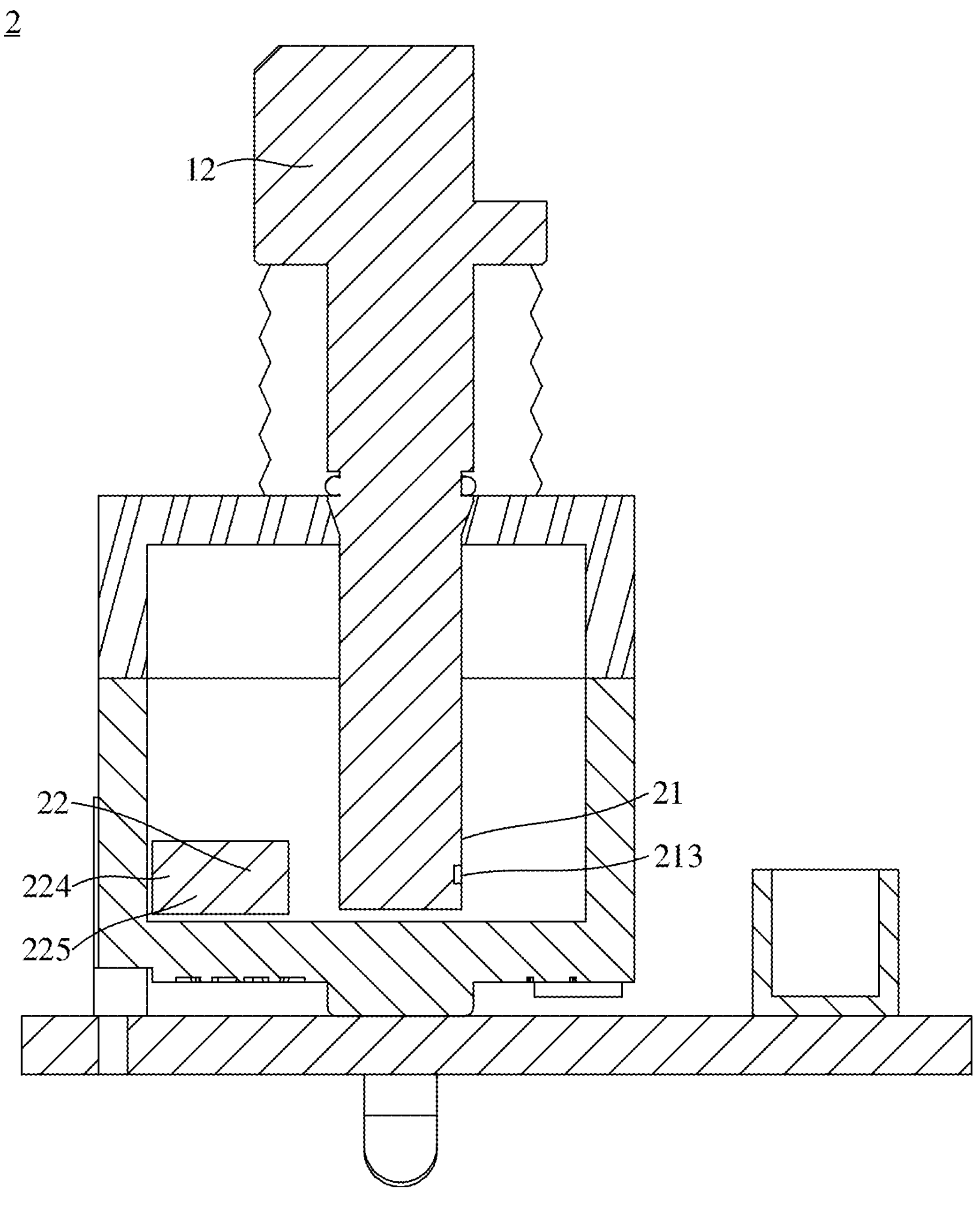
FIG. 8 is a cross-sectional schematic view of a knob detection structure according to other embodiments of the present disclosure.
Figure 9:
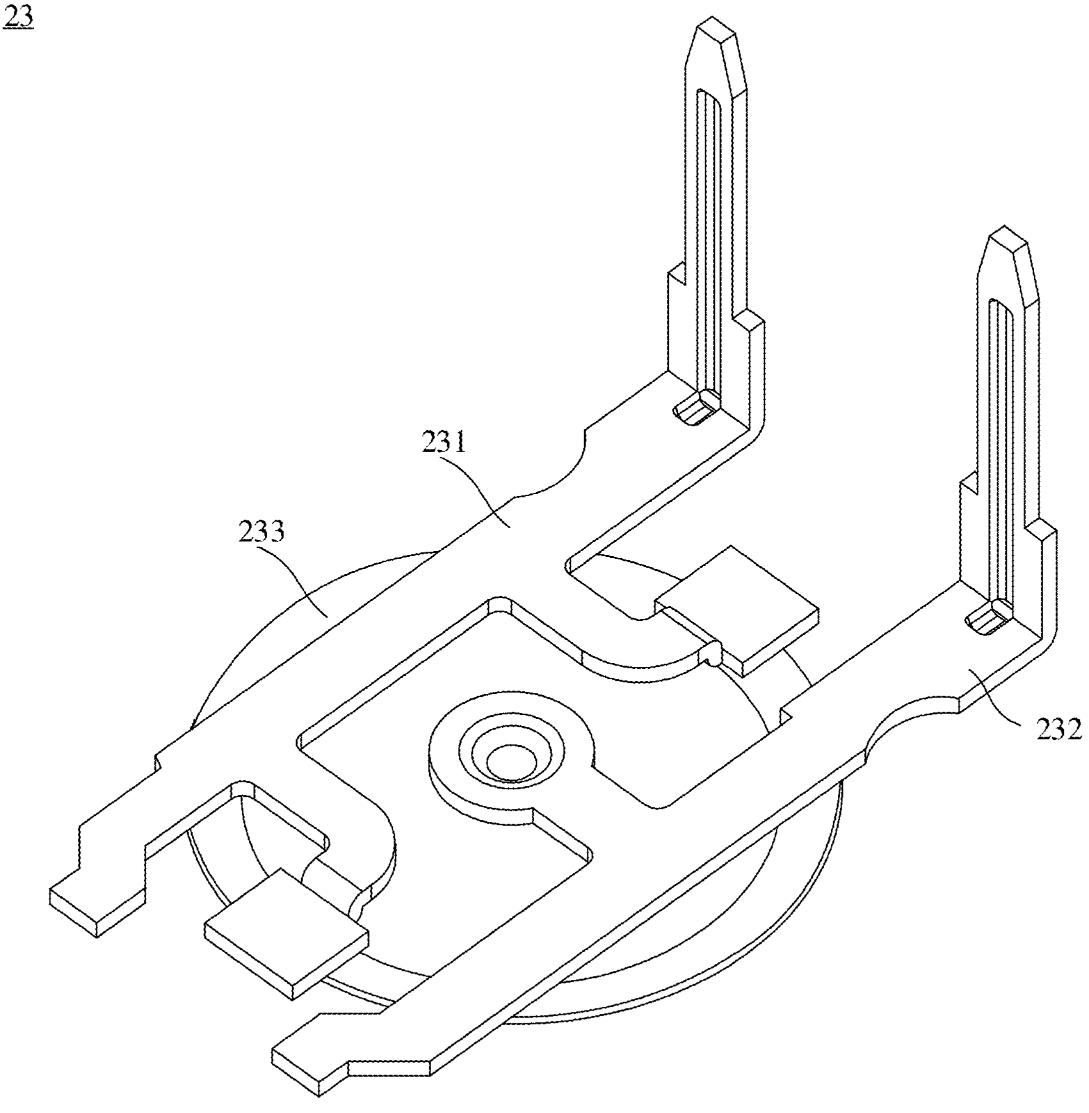
FIG. 9 is a structural schematic view of a pressure detection assembly according to some embodiments of the present disclosure.

Referring to FIGS. 1, 2, and 8, in other embodiments, the driven member 21 includes a reflective member 213, which is connected to the knob 12 and has different reflectivity rates at different positions along an axis of the knob 12; the rotation detection assembly 22 includes a light-emitting element 224 and a light-sensitive clement 225, with the light-emitting element 224 electrically connected to the main control board 131. The light-sensitive clement 225 is electrically connected to the main control board 131 and configured to receive the light signals cmitted by the light-emitting element 224 and reflected by the reflective member 213 and to generate different electrical signals, thereby enabling the main control board 131 to obtain the rotation parameters of the knob 12. It should be understood that the reflective member 213 includes at least one of the following regions: a light-dark marking region, a region with varying polish, a recessed region, and a protruding region.

For example, the rotation detection assembly 22 may include a light sensing chip, which has the light-emitting clement 224 and the light-sensitive element 225, enabling the light sensing chip to receive the light signals emitted by the light-emitting element 224 and reflected by the reflective member 213 and generate different electrical signals, thereby allowing the main control board 131 to obtain the rotation parameters of the knob 12.

It should be understood that the surface of the knob 12 may also be processed to form regions with different reflectivity, such that the light signals received by the light-sensitive element 225 are different, causing the light-sensitive element 225 to output different electrical signals. This allows the main control board 131 to obtain the corresponding electrical signals, i.e., the rotation parameters of the knob 12.

Referring to FIGS. 1-3 and 9, in some embodiments, the knob detection structure 2 further includes a pressure detection assembly 23, which is electrically connected to the main control board 131. When the knob 12 is pressed along its own axis, the pressure detection assembly 23 can generate corresponding press parameters. The main control board 131 may control the charging control unit 132 to operate based on the press parameters, which include at least one of: long press parameters and short press parameters. The main control board 131 may further control the display 134 to display the charging information of the charging control unit 132 based on the press parameters.

Referring to FIGS. 1-3, specifically, the pressure detection assembly 23 may include a third electrical connection member 231, a fourth electrical connection member 232, and a conductive elastic sheet 233. The third electrical connection member 231 is electrically connected to the main control board 131; the fourth electrical connection member 232 is electrically connected to the main control board 131 and is spaced apart from the third electrical connection member 231; the conductive elastic sheet 233 can be compressed by the knob 12 to deform, thereby establishing an electrical connection between the third electrical connection member 231 and the fourth electrical connection member 232. This allows the main control board 131 to obtain the press parameters of the knob 12, enabling the main control board 131 to control the operation of the charging control unit 132 based on the press parameters. The main control board 131 may further control the display 134 to show the charging information of the charging control unit 132 based on the press parameters.

Referring to FIGS. 1-3 and 9, for example, a central portion of the conductive elastic sheet 233 can deform under the pressure of the knob 12, while a contact point of the third electrical connection member 231 can remain in contact with a peripheral side of the conductive elastic sheet 233. The contact point of the fourth electrical connection member 232 is correspondingly positioned opposite the central portion of the conductive elastic sheet 233. When the knob 12 is pressed, the conductive elastic sheet 233 can deform toward the direction of the fourth electrical connection member 232 until the conductive elastic sheet 233 comes into contact with the fourth electrical connection member 232, thereby enabling the third electrical connection member 231 and the fourth electrical connection member 232 to be electrically connected through the conductive elastic sheet 233, and further enabling the main control board 131 to obtain the press parameters of the knob 12. The main control board 131 can determine the long press parameters and short press parameters based on the duration of the electrical connection between the third electrical connector 231 and the fourth electrical connector 232.

Furthermore, the third electrical connection member 231 may have multiple contact points that come into contact with the conductive elastic sheet 233, thereby reducing the probability of the third electrical connection member 231 disconnecting from the conductive elastic sheet 233 and improving the stability of the main control board 131 in obtaining the press parameters.

Referring to FIGS. 1, 2, and 7, it can be understood that, when the driven member 21 includes a magnetic member 212, and the rotation detection assembly 22 includes a magnetic sensing element 223, pressing the knob 12 along the axis of the knob 12 may further cause a change in the magnetic field at the location of the magnetic sensing element 223. The magnetic sensing element 223 can generate different electrical signals based on the magnetic field changes, enabling the main control board 131 to obtain the press parameters of the knob 12.

Referring to FIGS. 1, 2, and 8, it can be understood that, when the driven member 21 includes a reflective member 213, and the rotation detection assembly 22 includes a light-emitting element 224 and a light-sensitive element 225, pressing the knob 12 along the axis of the knob 12 may further cause the light-sensitive element 225 to receive the light signals emitted by the light-emitting element 224 and reflected by the reflective member 213, thereby generating different electrical signals. This also allows the main control board 131 to obtain the press parameters of the knob 12.

Referring to FIGS. 1, 2, and 7, it can be understood that, to facilitate button reset, the charger 1 may further include an elastic member, one end of which is connected to the knob 12, and the other end of which is connected to the housing 11. When the user presses the knob 12, the elastic member deforms, enabling the pressure detection assembly 23 to detect the press parameters. When the user does not press the knob 12, the elastic force of the elastic member pushes the knob 12 back to its original position, facilitating the user's next press of the knob 12.

It should be understood that the knob detection structure 2 may further include a toggle detection assembly (not shown), which is electrically connected to the main control board 131. When the knob 12 is toggled away from its own axis, the toggle detection assembly generates corresponding toggle parameters. The main control board 131 may control the charging control unit 132 to operate based on the toggle parameters, and the main control board 131 may further control the display 134 to display the charging information of the charging control unit 132 based on the toggle parameters.

For example, the knob detection structure 2 may further include a spherical shell, a spherical body, and a pivot rod. The spherical body is rotatably disposed within the spherical shell, which has an opening. One end of the pivot rod is connected to the spherical body, and the other end of the pivot rod extends through the opening and is connected to the knob 12. The toggle detection assembly may include at least one of a magnetic detection structure and a light detection structure.

For example, the toggle detection assembly may include a magnetic member and a magnetic sensing element, with the magnetic member arranged on the spherical body and the magnetic sensing element arranged on the spherical shell and electrically connected to the main control board 131. When the magnetic member moves with the spherical body, it causes a change in the magnetic field at the location of the magnetic sensing element. The magnetic sensing element generates different electrical signals based on the magnetic field changes, enabling the main control board 131 to obtain the toggle parameters of the knob 12. In the embodiments of the present disclosure, no specific restrictions are imposed on the position of the magnetic sensing element within the magnetic field of the magnetic member or its arrangement.

For example, the toggle detection assembly may include a reflective member, a light-emitting element, and a light-sensitive element. The reflective member is arranged on the surface of the spherical body, while the light-emitting element and the light-sensitive element are arranged on an inner wall of the spherical shell and electrically connected to the main control board 131, respectively. The light-sensitive element can receive the light signals emitted by the light-emitting element and reflected by the reflective element and generate different electrical signals, enabling the main control board 131 to obtain the toggle parameters of knob 12.

It should be understood that the surface of the sphere body may be processed to form regions with different reflectivity, such that the light signals received by the light-sensitive clements are different, causing the light-sensitive elements to output different electrical signals. This allows the main control board 131 to obtain the corresponding electrical signals, i.e., the parameters of the knob 12's rotation.

Figure 10:
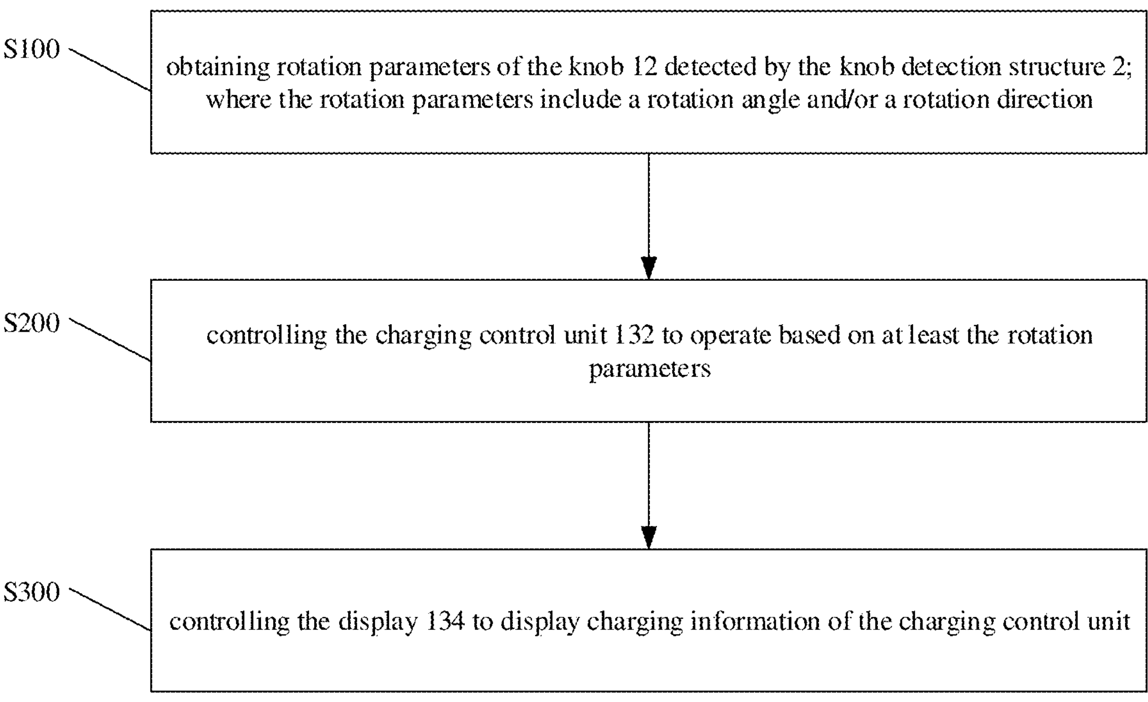
FIG. 10 is a flowchart of a method for controlling a charger according to some embodiments of the present disclosure.
Figure 11:
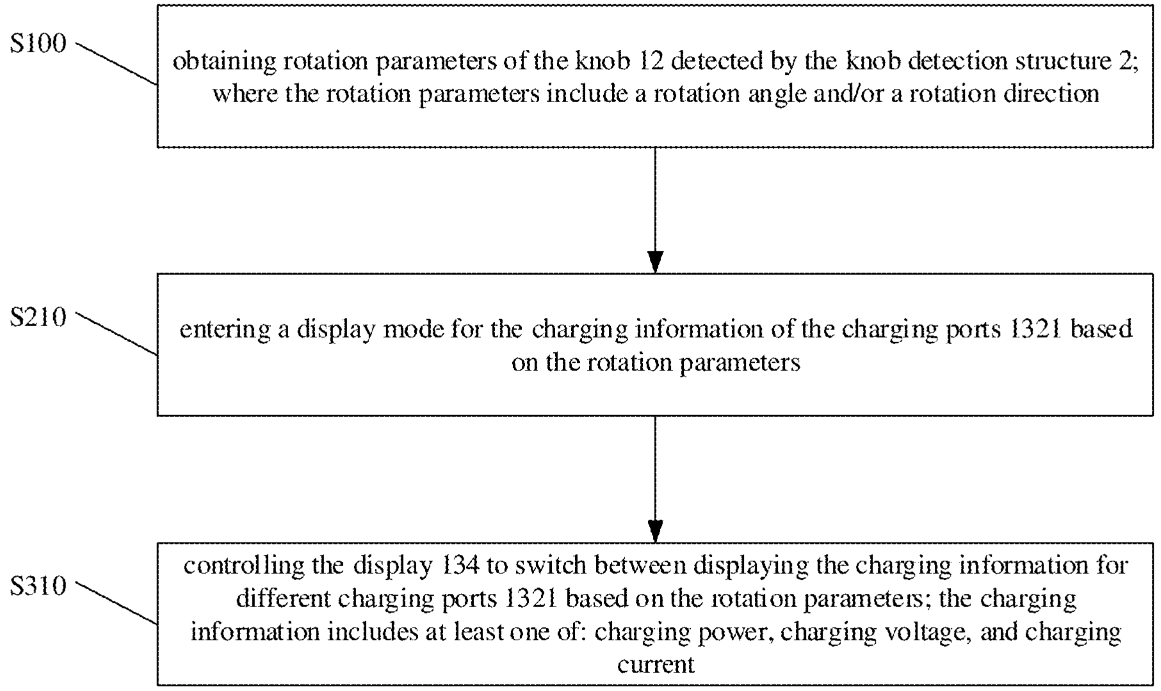
FIG. 11 is a flowchart of a method for controlling a charger according to other embodiments of the present disclosure.
Figure 12:
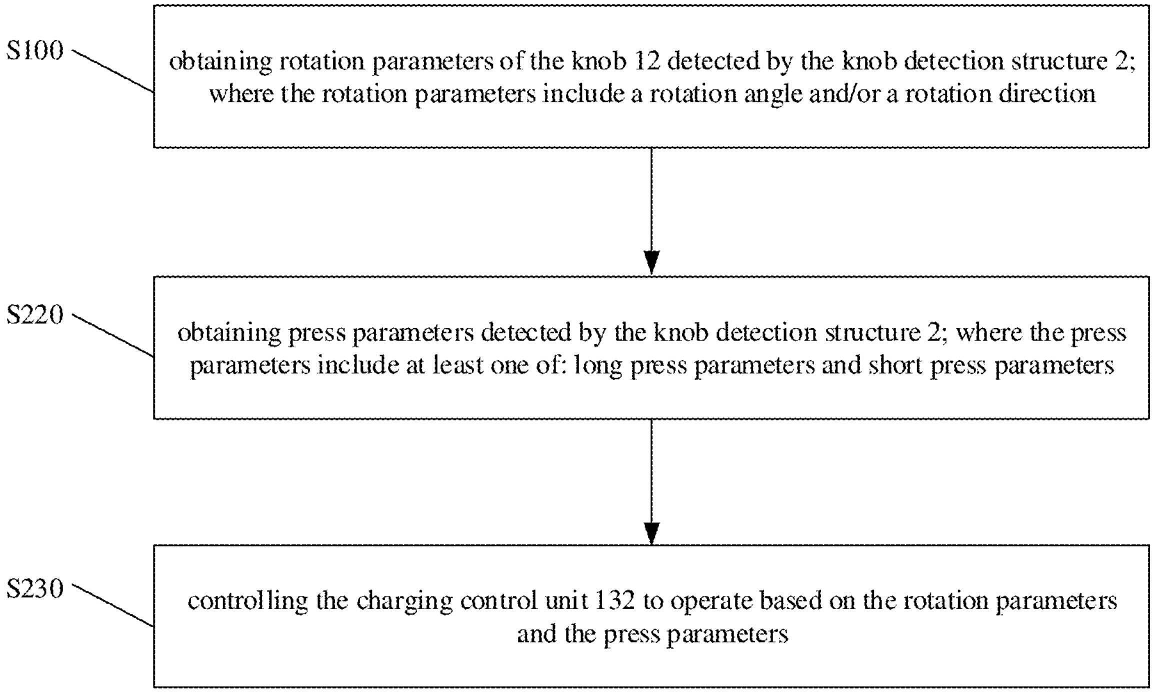
FIG. 12 is a flowchart of a method for controlling a charger according to further other embodiments of the present disclosure.
Figure 13:
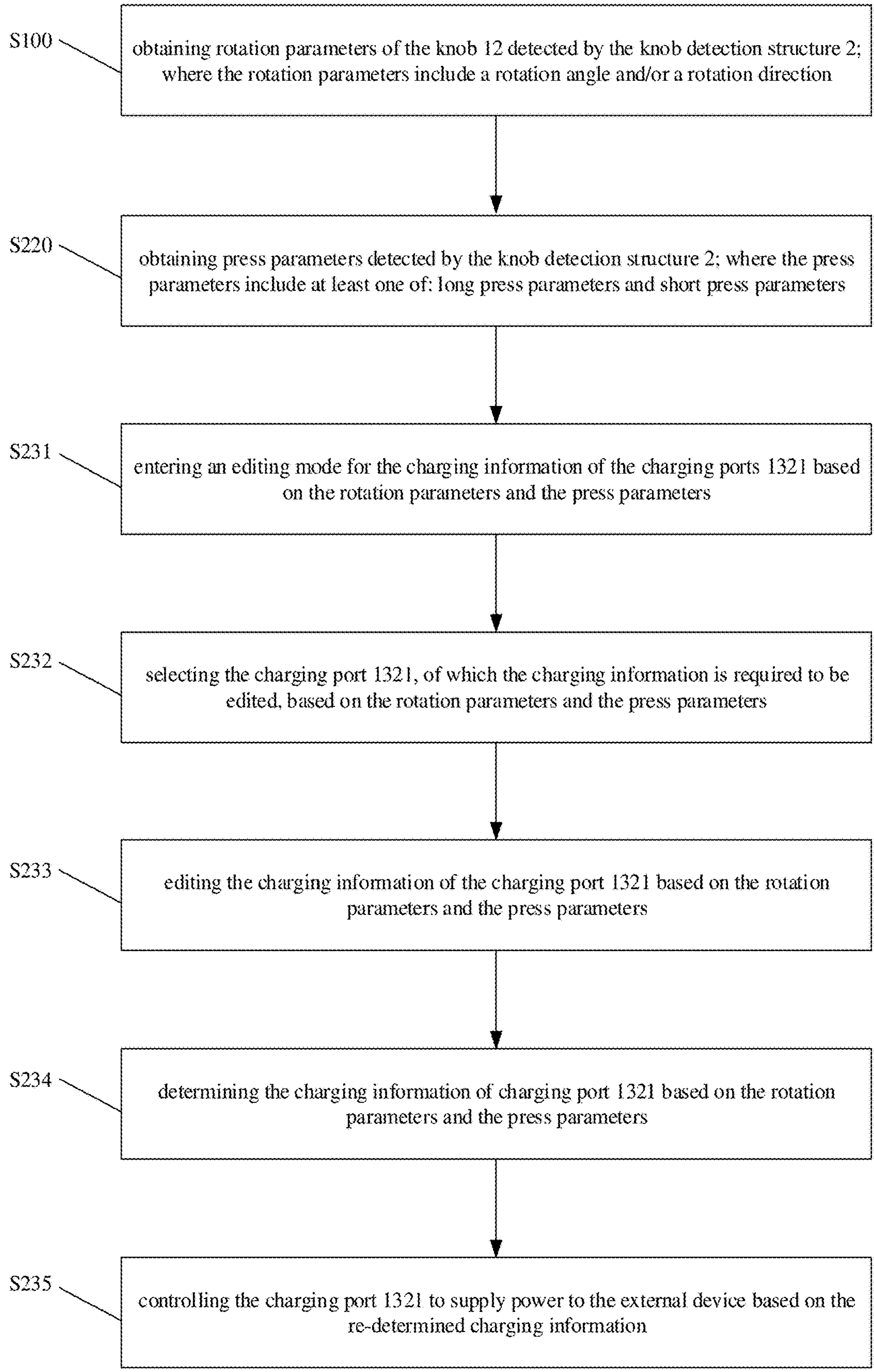
FIG. 13 is a flowchart of a method for controlling a charger according to still other embodiments of the present disclosure.
Figure 14:
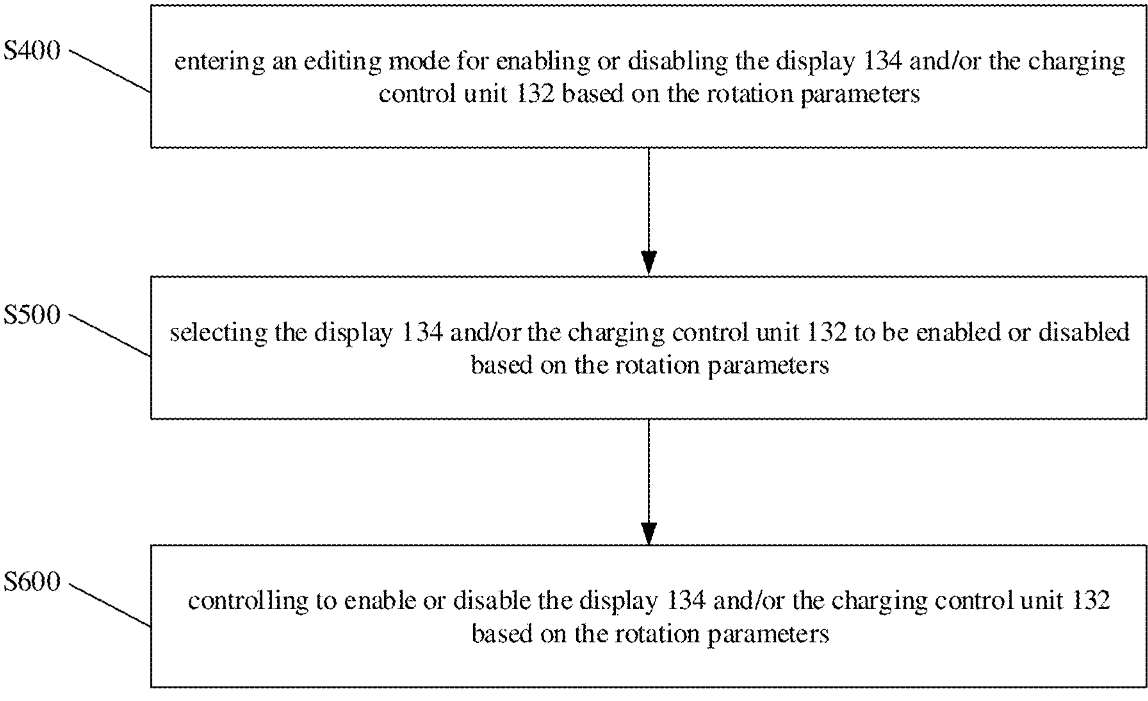
FIG. 14 is a flowchart of a method for controlling a charger according to still other embodiments of the present disclosure.
Figure 15:
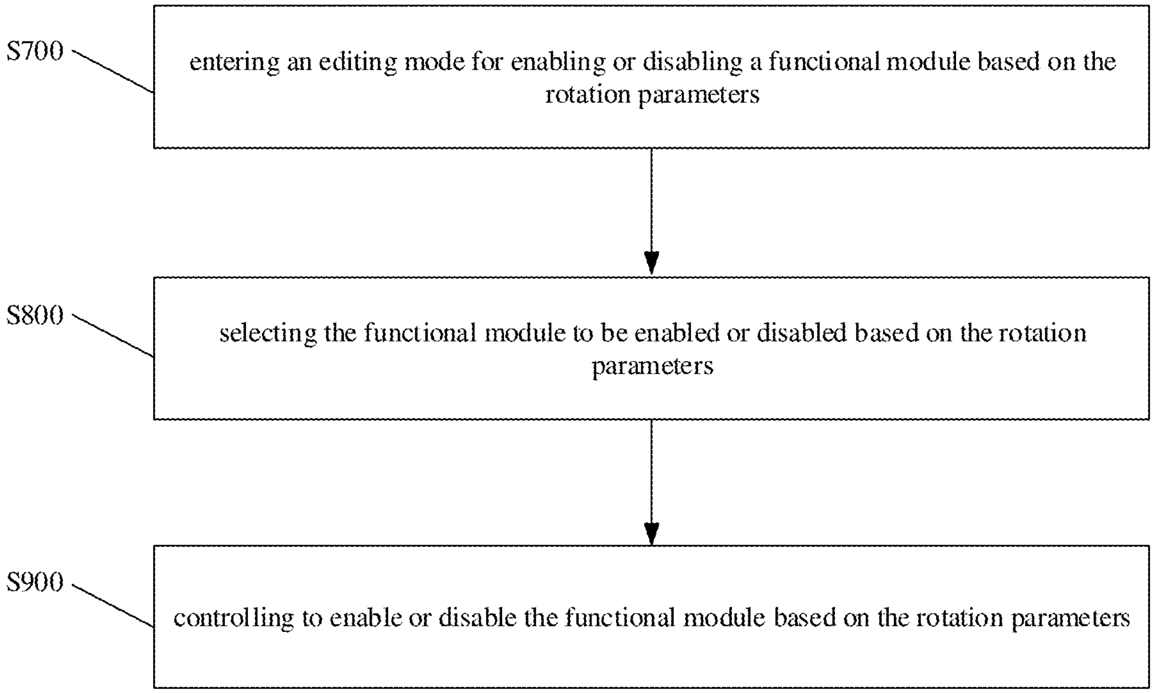
FIG. 15 is a flowchart of a method for controlling a charger according to still other embodiments of the present disclosure.
Figure 16:
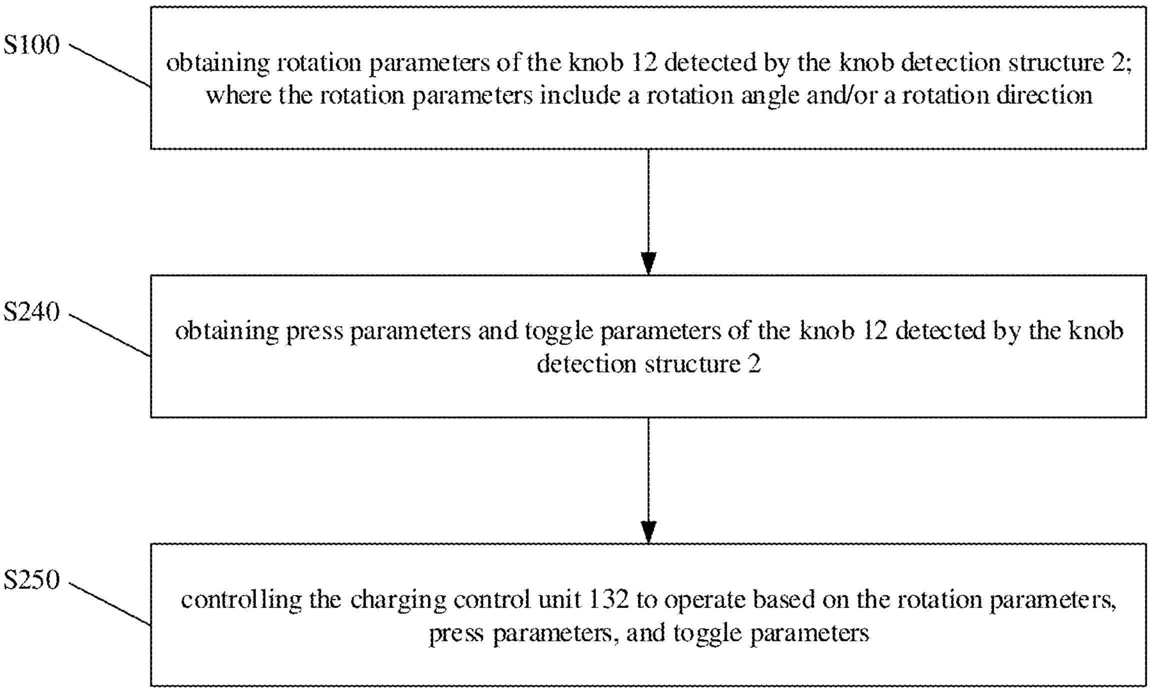
FIG. 16 is a flowchart of a method for controlling a charger according to still other embodiments of the present disclosure.

Referring to FIGS. 1, 2, and 10, the present disclosure further provides a method for controlling the charger 1. The method includes operations at blocks illustrated in FIG. 10.

At block S100: obtaining rotation parameters of the knob 12 detected by the knob detection structure 2; where the rotation parameters include a rotation angle and/or a rotation direction.

In the present embodiments, the user may rotate the knob 12 to drive the driven member 21 to rotate. The rotation detection assembly 22 cooperates with the driven member 21 to enable the main control board 131 to obtain the rotation parameters of the knob 12.

At block S200: controlling the charging control unit 132 to operate based on at least the rotation parameters.

In the present embodiments, the main control board 131 may control the charging control unit 132 to turn on or off based on the rotation parameters, or enter an editing mode for the charging information of the charging port 1321 based on the rotation parameters to edit the charging information of the charging port 1321.

At block S300: controlling the display 134 to display charging information of the charging control unit 132.

In the present embodiments, the main control board 131 may control the display 134 to display the on/off information of the charging control unit 132 based on the rotation parameters, or control the display 134 to display the charging information of the charging control unit 132.

It should be understood that in other embodiments, the main control board 131 may only control the display of the charging information of the charging control unit 134 via the rotation parameters. The main control board 131 may only control the operation of the charging control unit 134 via the rotation parameters.

Referring to FIGS. 1-8 and 11, in some embodiments, S200 includes the following operations.

At block S210: entering a display mode for the charging information of the charging ports 1321 based on the rotation parameters.

In the present embodiments, the main control board 131 may obtain the corresponding rotation parameters by rotating the knob 12, thereby enabling the main control board 131 to enter the display mode for the charging information of the charging port 1321 based on the obtained rotation parameters.

S300 includes the following operations.

At block S310: controlling the display 134 to switch between displaying the charging information for different charging ports 1321 based on the rotation parameters; the charging information includes at least one of: charging power, charging voltage, and charging current.

In the present embodiments, when the charger 1 is in the display mode for the charging information of the charging port 1321, rotating the knob 12 may cause the knob 12 to drive the driven member 21 to rotate, enabling the main control board 131 to obtain the rotation parameters of the knob 12 through the rotation detection assembly 22, thereby enabling the main control board 131 to control the display 134 to switch the display of the charging information of the charging ports 1321 based on the rotation parameters.

Specifically, the knob detection structure 2 may be an electrically-conductive mechanical structure. For example, the driven member 21 includes a conductive member 211, and the rotation detection assembly 22 includes a first electrical connection member 221, a second electrical connection member 222, and a rotation detection chip. When the user rotates the knob 12, the knob 12 drives the conductive member 211 to rotate, causing only one of the two second electrical connection members 222 to come into contact with contact portion 2112A and establish electrical contact, and the two second electrical connection members 222 alternately come into contact with one of the multiple contact portions 2112A to establish electrical contact, thereby switching the signal conduction. In combination with the rotation angle and direction of the knob 12 detected by the rotation detection chip, the current rotational position of the knob 12 can be determined, which corresponds to the rotation parameters of the knob 12 obtained by the main control board 131.

In other embodiments, the knob detection structure 2 may further detect the rotational position of the knob 12 through magnetic detection structures and optical detection structures, enabling the main control board 131 to obtain the rotation parameters of the knob 12. Further details are omitted herein.

It should be understood that the rotation parameters may be a pre-set rotational position of the knob 12. When the knob 12 is rotated to a first pre-set rotational position, the display 134 may display the charging information of a first charging port; when the knob 12 is rotated to a second rotational position, the display 134 may display the charging information of a second charging port; when the knob 12 is rotated to a third rotational position, the display 134 may display the charging information of a third charging port . . . and so on. The circumference may be uniformly divided into multiple rotational position groups, with cach rotational position group including multiple rotational positions. In this way, when the knob 12 is rotated, the display information can be cyclically switched, thereby achieving stepless adjustment of the knob 12.

Referring to FIGS. 1-3, 9, and 12, in some embodiments, S200 further includes the following operations.

At block S220: obtaining press parameters detected by the knob detection structure 2; where the press parameters include at least one of: long press parameters and short press parameters.

In the present embodiments, when the knob 12 is pressed along its own axial direction, the pressure detection assembly 23 may generate corresponding press parameters, enabling the knob detection structure 2 to detect the press parameters of the knob 12.

For example, when the user presses the knob 12 along its axial direction, the knob 12 may compress the conductive elastic sheet 233, causing the conductive elastic sheet 233 to deform toward the third electrical connection member 231 and the fourth electrical connection member 232, until the conductive clastic sheet 233 comes into contact with the third electrical connection member 231 and the fourth electrical connection member 232, thereby enabling the third electrical connection member 231 and the fourth electrical connection member 232 to be electrically connected through the conductive elastic sheet 233, thus allowing the main control board 131 to obtain the press parameters.

For example, when the user presses the knob 12 for a time less than or equal to a preset duration, the main control board 131 identifies it as the short press parameters; when the user presses the knob 12 for a time greater than the preset duration, the main control board 131 identifies it as the long press parameters. In the embodiments of the present disclosure, the preset duration may be 0.5 seconds, 1 second, or 1.5 seconds. In other embodiments, the preset duration may be other durations.

At block S230: controlling the charging control unit 132 to operate based on the rotation parameters and the press parameters.

In the present embodiments, the main control board 131 may enter an editing mode for the charging information of the charging port 1321 based on the rotation parameters and the press parameters to edit the charging information of the charging port 1321 the main control board 131 may enter an editing mode for the on/off state of the charging control unit 132 to control the on/off (enabling or disabling) state of the charging control unit 132.

For example, the main control board 131 may select, confirm, or cancel several basic functions based on the obtained short press parameters and display them on the display 134. The main control board 131 may reset the charger 1 to factory settings based on an obtained preset number of short press parameters, where the preset number may be 5 or 6. The main control board 131 may further disable the screen display function and wake up the display 134 based on the long press parameters.

It should be understood that in other embodiments, the charging control unit 132 may be controlled to operate solely based on the press parameters, and further details are omitted herein.

Referring to FIGS. 1-3 and 13, in some embodiments, S230 includes the following operations.

At block S231: entering an editing mode for the charging information of the charging ports 1321 based on the rotation parameters and the press parameters.

In the present embodiments, when the user needs to edit the charging information of the charging port 1321, he/she may rotate the knob 12 to enable the main control board 131 to obtain the rotation parameters and enter the editing mode for the charging information of the charging port 1321. In other embodiments, the user may enter the editing mode for the charging information of the charging port 1321 by short pressing or long pressing down the knob 12, such that the main control board 131 obtains the short press parameters or the long press parameters. It should be understood that the main control board 131 may enter the editing mode for the charging information of the charging port 1321 and control the display 134 to display the information through other methods, which are not described in detail herein.

At block S232: selecting the charging port 1321, of which the charging information is required to be edited, based on the rotation parameters and the press parameters.

In the present embodiments, in the editing mode for the charging information of the charging port 1321, the knob 12 may be rotated such that the main control board 131 can select the charging port 1321 whose charging information is required to be edited based on the rotation parameters. In other embodiments, the knob 12 may be short pressed or long pressed to enable the main control board 131 to select the charging port 1321 whose charging information is required to be edited based on the short press parameters or the long press parameters. It should be understood that other methods may be applied to select the charging port 1321 whose charging information is required to be edited, and further details are omitted herein.

At block S233: editing the charging information of the charging port 1321 based on the rotation parameters and the press parameters.

In the present embodiments, when the knob 12 is rotated, the main control board 131 may edit the charging information of charging port 1321 based on the rotation parameters. In other embodiments, the knob 12 may be short pressed or long pressed to enable the main control board 131 to edit the charging information of the charging port 1321 based on the short press parameters or the long press parameters. It is understood that the charging information of the charging port 1321 may be edited through other methods, which will not be elaborated further hercin.

At block S234: determining the charging information of charging port 1321 based on the rotation parameters and the press parameters.

In the present embodiments, when the knob 12 is rotated, the main control board 131 may determine the charging information of charging port 1321 based on the rotation parameters, thereby enabling charging port 1321 to output power to the external device according to the determined charging information. In other embodiments, the knob 12 may be short pressed or long pressed to enable the main control board 131 to determine the charging information of the charging port 1321 based on the short press parameters or the long press parameters. It should be understood that the charging information of the charging port 1321 may be determined through other methods, which will not be elaborated upon herein.

At block S235: controlling the charging port 1321 to supply power to the external device based on the re-determined charging information.

In the present embodiments, after the charging information of charging port 1321 is confirmed, the charger 1 may supply power to the corresponding charging port 1321 based on the charging information, thereby enabling the charging port 1321 to supply power to the external device based on the re-determined charging information.

Referring to FIGS. 1-3 and 14, in some embodiments, the control method further includes the following operations.

At block S400: entering an editing mode for enabling or disabling the display 134 and/or the charging control unit 132 based on the rotation parameters.

In the present embodiments, when the user needs to enter the editing mode for enabling or disabling the display 134 and/or the charging control unit 132, he/she may rotate the knob 12 to enable the main control board 131 to obtain the rotation parameters, thereby enabling the main control board 131 to enter the editing mode for enabling or disabling the display 134 and the charging control unit 132 based on the rotation parameters. In other embodiments, the user may enter the editing mode for enabling or disabling the display 134 and/or the charging control unit 132 by short pressing or long pressing the knob 12, such that the main control board 131 obtains the short press parameters or the long press parameters, and the main control board 131 may enter the editing mode for enabling or disabling the display 134 and the charging control unit 132 based on the short press parameters or the long press parameters. It should be understood that other methods may be applied to enter the editing mode for enabling or disabling the display 134 and the charging control unit 132, which will not be further elaborated herein.

At block S500: selecting the display 134 and/or the charging control unit 132 to be enabled or disabled based on the rotation parameters.

In the present embodiments, the knob 12 may be rotated to enable the main control board 131 to obtain the rotation parameters, allowing the main control board 131 to select the display 134 and charging control unit 132 to be enabled or disabled based on the rotation parameters. In other embodiments, the knob 12 may be short pressed or long pressed to enable the main control board 131 to obtain the short press parameters or long press parameters, allowing the main control board 131 to select the display 134 and charging control unit 132 to be enabled or disabled based on the short press parameters or long press parameters. It should be understood that other methods may be applied to select the display 134 and charging control unit 132 to be enabled or disabled, which will not be further elaborated hercin.

At block S600: controlling to enable or disable the display 134 and/or the charging control unit 132 based on the rotation parameters.

In the present embodiments, the knob 12 may be rotated to enable the main control board 131 to obtain the rotation parameters, enabling the main control board 131 to control the enabling or disabling of the display 134 and the charging control unit 132 based on the rotation parameters. In other embodiments, the knob 12 may be short pressed or long pressed to enable the main control board 131 to obtain the short press parameters or long press parameters, thereby enabling the main control board 131 to control the enabling or disabling of the display 134 and the charging control unit 132 based on the short press parameters or long press parameters. It should be understood that other methods may be applied to select the enabling or disabling of the display 134 and the charging control unit 132, which will not be further elaborated herein.

Referring to FIGS. 1-3 and 15, in some embodiments, the control method further includes the following operations.

At block S700: entering an editing mode for enabling or disabling a functional module based on the rotation parameters.

In the present embodiments, when the user needs to enter the editing mode for enabling or disabling the functional module, he/she may rotate the knob 12 such that the main control board 131 can obtain the rotation parameters, enabling the main control board 131 to enter the editing mode for enabling or disabling the functional module based on the rotation parameters. In other embodiments, the user may enter the editing mode for enabling or disabling the functional module by short pressing or long pressing the knob 12, such that the main control board 131 obtains the short press parameters or long press parameters, enabling the main control board 131 to enter the editing mode for enabling or disabling the functional module based on the short press parameters or long press parameters. It should be understood that other methods may be applied to enter the editing mode for enabling or disabling the functional module, which will not be further elaborated herein.

At block S800: selecting the functional module to be enabled or disabled based on the rotation parameters.

In the present embodiments, the knob 12 may be rotated to enable the main control board 131 to obtain the rotation parameters, enabling the main control board 131 to select the functional module to be enabled or disabled based on the rotation parameters. In other embodiments, the knob 12 may be short pressed or long pressed to enable the main control board 131 to obtain the short press parameters or long press parameters, enabling the main control board 131 to select the functional module to be enabled or disabled based on the short press parameters or long press parameters. It should be understood that other methods may be applied to select the functional module to be enabled or disabled, which will not be further elaborated herein.

At block S900: controlling to enable or disable the functional module based on the rotation parameters.

In the present embodiments, the knob 12 may be rotated to enable the main control board 131 to obtain the rotation parameters, enabling the main control board 131 to control the enabling or disabling of the functional module based on the rotation parameters. In other embodiments, the knob 12 may be short pressed or long pressed to enable the main control board 131 to obtain the short press parameters or long press parameters, thereby enabling the main control board 131 to control the enabling or disabling of the functional module based on the short press parameters or long press parameters. It should be understood that other methods may be applied to select the enabling or disabling of the functional module, which will not be further elaborated herein.

Referring to FIGS. 1-3 and 16, in some embodiments, S200 further includes the following operations.

At block S240: obtaining press parameters and toggle parameters of the knob 12 detected by the knob detection structure 2.

In the present embodiments, the main control board 131 may obtain the rotation parameters through the rotation detection component 22, obtain the press parameters through the pressing detection assembly 23, and obtain the toggle parameters through a toggle detection assembly.

At block S250: controlling the charging control unit 132 to operate based on the rotation parameters, press parameters, and toggle parameters.

In the present embodiments, the main control board 131 may enter the editing mode for the charging information of the charging port 1321 based on the rotation parameters, press parameters, and toggle parameters to edit the charging information of the charging port 1321; the main control board 131 may enter the editing mode for enabling or disabling of the charging control unit 132 to control the enabling and disabling of the charging control unit 132.

It should be understood that in other embodiments, the charging control unit 132 may be controlled by one of the rotation parameters, the press parameters, and the toggle parameters; or by two of the rotation parameters, the press parameters, and the toggle parameters. In the embodiments of the present disclosure, this is not described in detail.

The present disclosure further provides a storage medium, the storage medium storing a computer program, the computer program being executed by a processor to implement the operations of the above control method.

Referring to FIGS. 1, 2, 17, and 18, the present disclosure further provides a charging control circuit 3, which is disposed within the housing 11. The charging control circuit 3 includes a knob detection module 31, a main control chip 32, a display 134, and a charging control unit 132.

The knob detection module 31 is disposed within the housing 11 and connected to the knob 12. For example, the knob detection module 31 may include at least one of an electrically conductive detection circuit, a magnetic detection circuit, a light detection circuit, a pressure detection circuit, and a toggle detection circuit, such that the knob detection module 31 can obtain at least one of the rotation parameters, press parameters, and toggle parameters of the knob 12, thereby enabling the main control chip 32 to control the operation of the charging control unit 132 based on the corresponding parameters. Specifically, the knob detection module 31 is configured to detect at least the rotation parameters of the knob 12; for example, the rotation parameters may include the rotation angle and/or the rotation direction.

The main control chip 32 is disposed within the housing 11 and is electrically connected to the knob detection module 31 and to a battery. It should be understood that the knob detection module 31 may further include a detection board, which is electrically connected to the main control chip 32. The detection board is configured to detect at least one of the rotation parameters, press parameters, and toggle parameters of the knob 12 and to transmit the corresponding parameters to the main control chip 32.

The charging control unit 132 is electrically connected to the main control chip 32; the main control chip 32 is configured to control the operation of the charging control unit 132 at least based on the rotation parameters, and the main control chip 32 is further configured to control the display 134 to display the charging information of the charging control unit 132.

In the embodiments of the present disclosure, the main control chip 32 is capable of controlling the display 134 to switch the display of the charging information of the charging ports 1321 at least based on the rotation parameters; the charging information includes at least one of the charging power, charging voltage, and charging current.

In the embodiments of the present disclosure, the user may operate the knob 12 to enable the knob detection module 31 to detect at least the rotation parameters of the knob 12, thereby enabling the main control chip 32 to control the operation of the display 134 and the charging control unit 132 based on the rotation parameters to achieve control of the charger 1. Compared to a scheme where the user has to control the operation of the charger 1 by performing selection multiple times through multiple buttons, the present disclosure achieves control of the charger 1 by operating a single knob 12, thereby simplifying the user's operating steps and improving the usability of the charger 1, and further simplifies the control logic of the charger 1, reduces the complexity of the operating program of the charger 1, and improves the system stability of the charger 1. Furthermore, since the single knob 12 is enough to control the charger 1, the number of operable components on the charger I may be reduced, thereby optimizing its appearance layout. Further, the use of internal components in the charger 1 may be reduced, minimizing their space occupancy within the housing 11, thereby shrinking the volume of the housing 11 and making the overall dimensions of the charger 1 smaller, and thus facilitating user portability and usage.

It should be understood that the charger 1 may further includes a functional module, which includes at least one of: an IoT module, a Bluetooth module, a timing module, a power on/off module, and a wireless network module. The main control board 131 is further configured to control the operation of the functional module based on the rotation parameters.

Referring to FIGS. 1, 2, 17, and 18, in some embodiments, the knob detection module 31 includes a rotation detection circuit 311, which is connected to the main control chip 32. The main control chip 32 can obtain the rotation parameters of the knob 12 through the rotation detection circuit 311 and control the display 134, the charging control unit 132, and the functional modules to operate.

Specifically, the rotation detection circuit 311 includes multiple switching circuits 3111, each of which has a first power input terminal 3111A, a first signal output terminal 3111B, a first ground terminal 3111C, and a first controlled terminal 3111D. The first signal output terminal 3111B is electrically connected to the main control chip 32, and the first controlled terminal 3111D is electrically connected to the knob 12. When the knob 12 is rotated, the switching circuit 3111 is controlled to turn on or off, thereby enabling the main control chip 32 to receive the corresponding combination of electrical signals and thus obtain the rotation parameters.

Referring to FIGS. 1, 2, 17, and 18, for example, the charging control unit 132 includes four charging ports 1321, which are a first charging port, a second charging port, a third charging port, and a fourth charging port, respectively. The rotation detection circuit 311 may include three switching circuits 3111, which are a first switching circuit, a second switching circuit, and a third switching circuit, respectively. When the knob 12 is rotated to a first rotational position, the first switching circuit is turned on, and the second switching circuit and the third switching circuit are turned off, causing the display 134 to display the charging information of the first charging port; when the knob 12 is rotated to a second rotational position, the first switching circuit and the third switching circuit are turned off, and the second switching circuit is turned on, causing the display 134 to display the charging information of the second charging port; when the knob 12 is rotated to a third rotational position, the first switching circuit and the second switching circuit are turned off, and the third switching circuit is turned on, causing the display 134 to display the charging information of the third charging port; when the knob 12 is rotated to a fourth rotational position, the first switching circuit, the second switching circuit, and the third switching circuit are all turned on, causing the display 134 to display the charging information of the fourth charging port. Similarly, the circumference may be uniformly divided into multiple rotational position groups, with each rotational position group including multiple rotational positions. In this way, when the knob 12 is rotated, the display information can be cyclically switched, thereby achieving stepless adjustment of the knob 12.

Referring to FIGS. 1, 2, 17, and 18, in some embodiments, the switching circuit 3111 includes a first resistor R1 and a switching element K1. A first end of the first resistor R1 is electrically connected to the first power input terminal 3111A, and a second end of the first resistor R1 is electrically connected to the first signal output terminal 3111B; an input end of the switching element K1 is electrically connected to the first signal output terminal 3111B, an output end of the switching element K1 is electrically connected to the first ground terminal 3111C, and a controlled end of the switching clement KI is electrically connected to the first controlled terminal 3111D.

When the switching element K1 is turned off, the main control chip 32 receives a high-level signal; when the switching element K1 is turned on, the second end of the first resistor R1 is grounded, causing the main control chip 32 to receive a low-level signal. As a result, when the knob 12 is rotated to a corresponding position, the main control chip 32 can receive a combination of high-level and low-level signals from the switching circuits 3111, enabling the main control chip 32 to obtain the rotation parameters of the knob 12. Based on these rotation parameters, the main control chip 32 can control the display 134, the charging control unit 132, and the functional modules.

It should be understood that in other embodiments, when the switching element K1 is turned off, the main control chip 32 receives a low-level signal; when the switching element K1 is turned on, the second end of the first resistor R1 is grounded, causing the main control chip 32 to receive a high-level signal. Similarly, the main control chip 32 can receive a combination of high-level and low-level signals to obtain the rotation parameters of the knob 12.

It should be understood that the switching element K1 may be at least one of a bipolar junction transistor (BJT), a field-effect transistor (MOS), an insulated gate bipolar transistor (IGBT), or an electromagnetic relay. In the embodiments of the present disclosure, the specific form of the switching element K1 is not limited.

It should be understood that all switching elements K1 in the switching circuits 3111 may be integrated into a mechanical switch for casy triggering by the knob 21.

Referring to FIGS. 1, 2, 17, and 18, in some embodiments, the switching circuit 3111 further includes a first capacitor C1; a first plate of the first capacitor C1 is electrically connected to the first signal output terminal 3111B, and a second plate of the first capacitor C1 is electrically connected to the first ground terminal 3111C. The first capacitor C1 may stabilize the voltage at the first signal output terminal 3111B at a high level when the switching element K1 is turned off, and stabilize the voltage at the first signal output terminal 3111B at a low level when the switching element K1 is turned on, thereby improving the stability of the output signal at the first signal output terminal 3111B and, consequently, improving the accuracy of the rotation parameters obtained by the main control chip 32. Additionally, the first capacitor C1 may function as a filter capacitor to reduce interference signals and noise signals entering the main control chip 32 through the first signal output terminal 3111B, thereby improving the accuracy of the rotation parameters obtained by the main control chip 32.

Referring to FIGS. 1, 2, 17, and 18, in some embodiments, the switching circuit 3111 further includes a second capacitor C2; a first plate of the second capacitor C2 is electrically connected to the first power input terminal 3111A, and a second plate of the second capacitor C2 is grounded. The second capacitor C2 is configured to stabilize the voltage at the first power input terminal 3111A, thereby ensuring that the voltage entering the main control chip 32 through the first signal output terminal 3111B remains stable, which improves the accuracy of the rotation parameters obtained by the main control chip 32. Additionally, the second capacitor C2 may function as a filter capacitor to reduce interference signals and noise signals entering the switching circuit 3111 through the first power input terminal 3111A, thereby further improving the accuracy of the rotation parameters obtained by the main control chip 32.

Referring to FIGS. 1, 2, 17, and 18, in some embodiments, the switching circuit 3111 further includes a second resistor R2; a first end of the second resistor R2 is electrically connected to the second end of the first resistor R1, and a second end of the second resistor R2 is electrically connected to the first signal output terminal 3111B. The second resistor R2 is configured to divide the voltage and limit the current of the electrical signal entering the main control chip 32 through the first signal output terminal 3111B, thereby preventing high voltage and large current from entering the main control chip 32, reducing the probability of damage to the main control chip 32, enabling the main control chip 32 to have a longer service life, and consequently enabling the charging control circuit 3 to have a longer service life, thereby enabling the charger 1 to have a longer service life.

Referring to FIGS. 1, 2, 19, and 20, in some embodiments, the knob 12 is arranged with a magnetic member 212, and the rotation detection circuit 311 includes a magnetic sensing chip 3112, which is electrically connected to the main control chip 32. When the magnetic member 212 moves with the knob 12, the magnetic field strength at the position of the magnetic sensing chip 3112 changes, enabling the main control chip 32 to receive different electrical signals transmitted by the magnetic sensing chip 3112, thereby receiving the rotation parameters.

For example, the magnetic member 212 may be a magnet, and the magnetic sensing chip 3112 may output different electrical signals based on different magnetic field strengths. Specifically, when the knob 12 drives the magnet to move, the magnetic field strength around the magnetic sensing chip 3112 changes, causing the magnetic sensing chip 3112 to output different electrical signals. This allows the main control chip 32 to obtain electrical signals corresponding to the position of the magnet, i.e., the rotation parameters of the knob 12. The main control chip 32 can then control the display 134, charging control unit 132, and functional modules.

Referring to FIGS. 1, 2, 21, and 22, in some embodiments, the knob 12 is arranged with a reflective member 213, which has different reflectivity rates at different positions along an axis of the knob 12. The rotation detection circuit 311 includes a light sensing chip 3113, the light sensing chip 3113 includes a light-emitting element 224 and a light-sensitive clement 225, and the light-emitting element 224 and the light-sensitive element 225 are both electrically connected to the main control chip 32. The light-sensitive element 225 is configured to receive light signals emitted by the light-emitting element 224 and reflected by the reflective clement 213, and generate different electrical signals, enabling the main control chip 32 to obtain the rotation parameters of the knob 12. It should be understood that the reflective member 213 includes at least one of the following regions: a light/dark marking region, a region with varying polish, and regions with recesses and protrusions.

It can be understood that the surface of the knob 12 may also be processed to form regions with different reflectivity, such that the light signals received by the light-sensitive clement 225 are different, causing the light-sensitive element 225 to output different electrical signals. This allows the main control chip 32 to obtain electrical signals corresponding to the position of the magnet, i.e., to obtain the rotation parameters of the knob 12.

Figure 23:
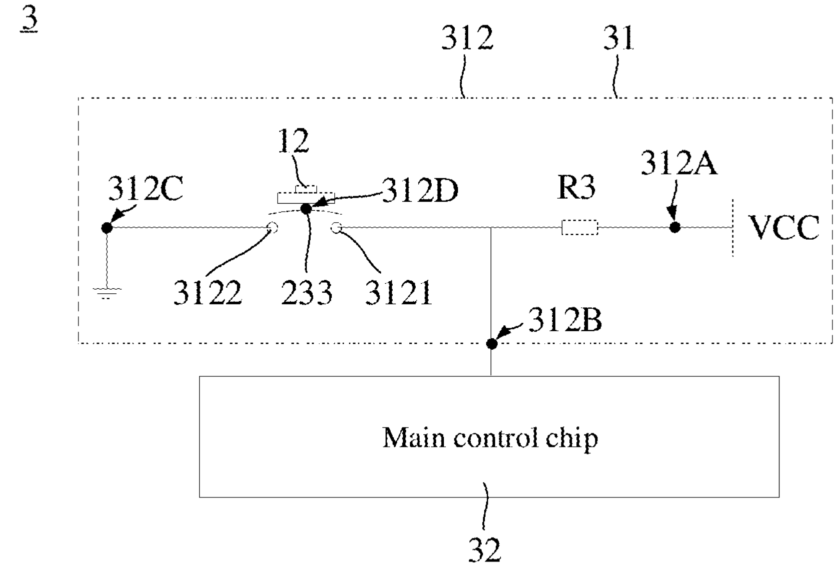
FIG. 23 is a circuit diagram of a pressure detection circuit according to some embodiments of the present disclosure.

Referring to FIGS. 1, 2, and 23, in some embodiments, the knob detection module 31 further includes a pressure detection circuit 312, which has a second power input terminal 312A, a second signal output terminal 312B, a second ground terminal 312C, and a second controlled terminal 312D. The second signal output terminal 312B is connected to the main control chip 32, and the second controlled terminal 312D of the pressure detection circuit 312 is connected to the knob 12. The main control chip 32 can obtain the press parameters of the knob 12 through the pressure detection circuit 312 and control the display 134, the charging control unit 132, and the functional modules to operate.

Specifically, the pressure detection circuit 312 includes a third resistor R3, a first contact point 3121, a second contact point 3122, and a conductive clastic sheet 233. A first end of the third resistor R3 is electrically connected to the second power input terminal 312A, and a second end of the third resistor R3 is electrically connected to the second signal output terminal 312B; the first contact point 3121 is electrically connected to the second end of the third resistor R3; the second contact point 3122 is electrically connected to the second ground terminal 312C; the conductive clastic sheet 233 is connected to the knob 12 and serves as the second controlled terminal 312D; the conductive clastic sheet 233 can be compressed by the knob 12 moving along its own axis to deform, thereby establishing electrical contact between the first contact point 3121 and the second contact point 3122, enabling the main control chip 32 to obtain the press parameters of the knob 12.

When the user rotates the knob 12, the knob 12 can come into contact with or be spaced apart from the conductive elastic sheet 233; when the user presses the knob 12, the knob 12 can squeeze the conductive elastic sheet 233, causing the conductive elastic sheet 233 to deform, thereby connecting the first contact point 3121 and the second contact point 3122 via the conductive clastic sheet 233, enabling the main control chip 32 to obtain the press parameters of the knob 12.

It can be understood that, when the driven member 21 includes a magnetic member 212, and the rotation detection assembly 22 includes a magnetic sensing clement 223, pressing the knob 12 along its axis may further cause a change in the magnetic field at the location of the magnetic sensing element 223. The magnetic sensing element 223 can generate different electrical signals based on the magnetic field changes, enabling the main control chip 32 to obtain the press parameters of the knob 12.

It can be understood that, when the driven member 21 includes a reflective member 213, and the rotation detection assembly 22 includes a light-emitting element 224 and a light-sensitive element 225, pressing the knob 12 along its axis may further cause the light-sensitive element 225 to receive the light signals emitted by the light-emitting element 224 and reflected by the reflective member 213, thereby generating different electrical signals. This also allows the main control board 131 to obtain the press parameters of the knob 12.

It should be understood that in other embodiments, the knob detection module 31 further includes a toggle detection circuit (not shown), which is electrically connected to the main control chip 32. When the knob 12 is toggled away from its own axis, the toggle detection circuit generates corresponding toggle parameters, and the main control chip 32 controls the display 134, the charging control unit 132, and the functional modules based on the toggle parameters.

In the drawings of the present disclosure, the same or similar reference numerals denote the same or similar components. In the description of the present disclosure, it should be understood that terms such as "up", "down", "left", and "right" indicating directions or positions are based on the directions or positions shown in the drawings, solely for the purpose of facilitating the description of the present disclosure and simplifying the description, and are not intended to indicate or imply that the devices or elements referred to must have a specific orientation, be constructed in a specific orientation, or operate in a specific orientation. Therefore, the terms used in the drawings to describe positional relationships are merely for illustrative purposes and should not be construed as limiting the scope of the present disclosure. For those skilled in the art, the specific meaning of the above terms may be understood based on the specific circumstances.

The above is merely some embodiments of the present disclosure and is not intended to limit the scope of the present disclosure. Any modifications, equivalent replacements, or improvements made within the spirit and principles of the present disclosure should be included within the scope of the present disclosure.

The invention claimed is:

1. A charger, comprising:

a housing;

a knob, rotatably arranged on the housing;

a knob detection structure, disposed within the housing and connected to the knob; wherein the knob detection structure is configured to detect at least rotation parameters of the knob; the rotation parameters comprise at least one of a rotation angle and a rotation direction; wherein the knob detection structure comprises a pressure detection assembly, electrically connected to the main control board; in a case where the knob is pressed along an axis of the knob, the pressure detection assembly generates press parameters; the press parameters comprise at least one of:

long press parameters and short press parameters;

a main control board, disposed within the housing and electrically connected to the knob detection structure;

a display, arranged on the housing and exposed through the housing; wherein the display is electrically connected to the main control board; and a charging control unit, electrically connected to the main control board;

wherein the main control board is configured to control the charging control unit to operate according to the rotation parameters and the press parameters, and the main control board is further configured to control the display to display charging information of the charging control unit.

2. The charger according to claim 1, wherein the knob detection structure comprises:

a driven member, connected to the knob and being rotatable following the knob; and a rotation detection assembly, electrically connected to the main control board; wherein the rotation detection assembly is configured to cooperate with the driven member to enable the main control board to obtain the rotation parameters of the knob.

3. The charger according to claim 2, wherein the driven member comprises a conductive member, connected to the knob;

the rotation detection assembly comprises:

a first electrical connection member, connected to the conductive member;

a second electrical connection member, spaced apart from the first electrical connection member and electrically connected to the conductive member, enabling the second electrical connection member to be electrically connected to the first electrical connection member; and a rotation detection chip, electrically connected to the main control board and configured to detect the rotation angle and the rotation direction of the knob, enabling the main control board to obtain the rotation angle and the rotation direction through the rotation detection chip and to obtain the rotation parameters of the knob in combination with conductive signals from the second electrical connection member and the first electrical connection member.

4. The charger according to claim 3, wherein the conductive member comprises:

a conductive disk, connected to the knob along an axis of the knob; wherein an axis of the conductive disk is collinear with the axis of the knob; and an enclosure edge, surrounding a peripheral side of the conductive disk; wherein the enclosure edge comprises a plurality of contact portions uniformly spaced along a periphery of the conductive disk, and the plurality of contact portions are configured to be electrically connected to the second electrical connection member.

5. The charger according to claim 4, wherein the second electrical connection member comprises two second electrical connection members that are spaced apart; during a rotation of the knob relative to the housing, a number of an electrical connection member, among the two second electrical connection members, that is in conductive contact with one of the plurality of contact portions is always one, and the two second electrical connection members alternately serve as the electrical connection member.

6. The charger according to claim 1, wherein the pressure detection assembly comprises:

a third electrical connection member, electrically connected to the main control board a fourth electrical connection member, electrically connected to the main control board and spaced apart from the third electrical connection member; and a conductive elastic sheet; wherein in a case where the knob is pressed along the axis of the knob, the conductive elastic sheet is compressed by the knob to deform, establishing an electrical connection between the third electrical connection member and the fourth electrical connection member and enabling the main control board to obtain the press parameters of the knob.

7. The charger according to claim 1, wherein the knob detection structure further comprises:

a toggle detection assembly, electrically connected to the main control board; wherein in a case where the knob is toggled away from an axis of the knob, the toggle detection assembly generates toggle parameters;

wherein the main control board is further configured to control the charging control unit to operate according to the rotation parameters and the toggle parameters.

8. The charger according to claim 1, wherein the charging control unit comprises a plurality of charging ports, arranged on the housing and exposed through the housing, and the plurality of charging ports are all electrically connected to the main control board;

wherein the main control board to configured to control the plurality of charging ports to operate according to at least the rotation parameters; the main control board is further configured to control the display to switch a display of the charging information of the plurality of charging ports; the charging information comprises at least one of: charging power, charging voltage, and charging current.

9. A charging control circuit, adapted to a charger;

wherein the charger comprises:

a housing;

a knob, rotatably arranged on the housing;

a knob detection structure, disposed within the housing and connected to the knob; wherein the knob detection structure is configured to detect at least rotation parameters of the knob; the rotation parameters comprise at least one of a rotation angle and a rotation direction;

a main control board, disposed within the housing and electrically connected to the knob detection structure;

a display, arranged on the housing and exposed through the housing; wherein the display is electrically connected to the main control board; and a charging control unit, electrically connected to the main control board;

wherein the main control board is configured to control the charging control unit to operate according to at least the rotation parameters, and the main control board is further configured to control the display to display charging information of the charging control unit;

wherein the charging control circuit comprises:

a knob detection module, configured to obtain at least the rotation parameters of the knob;

wherein the knob detection module comprises a pressure detection circuit; and a main control chip, configured to be disposed on the main control board and electrically connected to the knob detection module; wherein the display is configured to be electrically connected to the main control chip, and the charging control unit is configured to be electrically connected to the main control chip;

wherein the main control chip is configured to control the charging control unit to operate according to at least the rotation parameters, and the main control chip is further configured to control the display to display the charging information of the charging control unit according to at least the rotation parameters; the main control chip is further configured to obtain press parameters of the knob and control the charging control unit to operate through the press detection circuit.

10. The charging control circuit according to claim 9, wherein the knob detection module comprises:

a rotation detection circuit, connected to the main control chip; wherein the main control chip is configured to obtain the rotation parameters of the knob through the rotation detection circuit and control the display and the charging control unit to operate.

11. The charging control circuit according to claim 10, wherein the rotation detection circuit comprises:

a plurality of switching circuits; wherein each switching circuit comprises a first power input terminal, a first signal output terminal, a first ground terminal, and a first controlled terminal; the first power input terminal is configured to connect to a power supply, and the first ground terminal is configured for grounding; the first signal output terminal is electrically connected to the main control chip, and the first controlled terminal is configured to be electrically connected to the knob;

wherein a rotation of the knob is capable of controlling the plurality of switching circuits to turn on or turn off, enabling the main control chip to receive a corresponding combination of electrical signals and obtain the rotation parameters.

12. The charging control circuit according to claim 11, wherein each switching circuit further comprises:

a first resistor; wherein a first end of the first resistor is electrically connected to the first power input terminal, and a second end of the first resistor is electrically connected to the first signal output terminal; and a switching element; wherein an input end of the switching element is electrically connected to the first signal output terminal, an output end of the switching element is electrically connected to the first ground terminal, and a controlled end of the switching element is electrically connected to the first controlled terminal.

13. The charging control circuit according to claim 12, wherein each switching circuit further comprises at least one of:

a first capacitor; wherein a first plate of the first capacitor is electrically connected to the first signal output terminal, and a second plate of the first capacitor is electrically connected to the first ground terminal;

a second capacitor; wherein a first plate of the second capacitor is electrically connected to the first power input terminal, and a second plate of the second capacitor is grounded; and a second resistor; wherein a first end of the second resistor is electrically connected to the second end of the first resistor, and a second end of the second resistor is electrically connected to the first signal output terminal.

14. The charging control circuit according to claim 10, wherein the knob is arranged with a magnetic member, and the rotation detection circuit comprises a magnetic sensing chip electrically connected to the main control chip; during the magnetic member moving along with the knob, a magnetic field strength at a position of the magnetic sensing chip changes, enabling the main control chip to receive different electrical signals transmitted by the magnetic sensing chip, for receiving the rotation parameters; or the knob is arranged with a reflective member, and the reflective member has different reflectivity rates at different positions along an axis of the knob; the rotation detection circuit comprise a light sensing chip, the light sensing chip comprise a light-emitting element and a light-sensitive element, and the light-emitting element and the light-sensitive element are both electrically connected to the main control chip; wherein the light-sensitive element is configured to receive light signals emitted by the light-emitting element and reflected by the reflective element and generate different electrical signals, enabling the main control chip to obtain the rotation parameters of the knob.

15. The charging control circuit according to claim 9, wherein the pressure detection circuit comprises a second power input terminal, a second signal output terminal, a second ground terminal, and a second controlled terminal; wherein the second power input terminal is configured to connect to a power supply, and the second ground terminal is configured for grounding; the second signal output terminal is connected to the main control chip, and the second controlled terminal is configured to be connected to the knob.

16. The charging control circuit according to claim 15, wherein the pressure detection circuit further comprises:

a third resistor; wherein a first end of the third resistor is electrically connected to the second power input terminal, and a second end of the third resistor is electrically connected to the second signal output terminal;

a first contact point, electrically connected to the second end of the third resistor; and a second contact point, electrically connected to the second ground terminal;

wherein the second controlled terminal is a conductive elastic sheet; in a case where the knob is pressed along an axis of the knob, the conductive elastic sheet is compressed by the knob to deform, establishing an electrical contact between the first contact point and the second contact point and enabling the main control chip to obtain the press parameters of the knob.

17. A method for controlling a charger;

wherein the charger comprises:

a housing;

a knob, rotatably arranged on the housing;

a knob detection structure, disposed within the housing and connected to the knob; wherein the knob detection structure is configured to detect at least rotation parameters of the knob; the rotation parameters comprise at least one of a rotation angle and a rotation direction; wherein the knob detection structure comprises a pressure detection assembly, electrically connected to the main control board; in a case where the knob is pressed along an axis of the knob, the pressure detection assembly generates press parameters; the press parameters comprise at least one of:

long press parameters and short press parameters;

a main control board, disposed within the housing and electrically connected to the knob detection structure;

a display, arranged on the housing and exposed through the housing; wherein the display is electrically connected to the main control board; and a charging control unit, electrically connected to the main control board;

wherein the main control board is configured to control the charging control unit to operate according to the rotation parameters and the press parameters, and the main control board is further configured to control the display to display charging information of the charging control unit;

wherein the method comprises:

obtaining the rotation parameters of the knob detected by the knob detection structure;

controlling the charging control unit to operate according to at least the rotation parameters; and controlling the display to display the charging information of the charging control unit.

18. The method according to claim 17, wherein the controlling the charging control unit to operate according to at least the rotation parameters comprises:

obtaining press parameters detected by the knob detection structure; wherein the press parameters comprise at least one of: long press parameters and short press parameters; and controlling the charging control unit to operate according to the rotation parameters and the press parameters.

19. The method according to claim 18, wherein the charging control unit comprises a plurality of charging ports, and the controlling the charging control unit to operate according to the rotation parameters and the press parameters comprises:

entering an editing mode for the charging information of the plurality of charging ports according to the rotation parameters and the press parameters;

selecting a charging port, of which the charging information is required to be edited, among the plurality of charging ports according to the rotation parameters and the press parameters;

editing the charging information of the charging port according to the rotation parameters and the press parameters;

determining a re-determined charging information of charging port according to the rotation parameters and the press parameters; and controlling the charging port to supply power to an external device according to the re- determined charging information;

wherein the charging information comprises at least one of: charging power, charging voltage, and charging current.

* * * * *